United States Patent
Ge et al.

(10) Patent No.: US 10,732,330 B2
(45) Date of Patent: Aug. 4, 2020

(54) HIGH EFFICIENCY DIFFUSION LIGHTING COVERINGS

(71) Applicants: Arkema France, Colombes (FR); Jiaxin Jason Ge, Lower Providence, PA (US); Michael T. Burchill, Langhorne, PA (US); Gary A. Hall, Oaklyn, NJ (US); Florence Mehlmann, Berwyn, PA (US)

(72) Inventors: Jiaxin Jason Ge, Lower Providence, PA (US); Michael T. Burchill, Langhorne, PA (US); Gary A. Hall, Oaklyn, NJ (US); Florence Mehlmann, Berwyn, PA (US)

(73) Assignee: Arkema France, Colombes (FR)

( * ) Notice: Subject to any disclaimer, the term of this patent is extended or adjusted under 35 U.S.C. 154(b) by 0 days.

(21) Appl. No.: 15/552,960

(22) PCT Filed: Feb. 23, 2016

(86) PCT No.: PCT/US2016/019022
§ 371 (c)(1),
(2) Date: Aug. 23, 2017

(87) PCT Pub. No.: WO2016/137919
PCT Pub. Date: Sep. 1, 2016

(65) Prior Publication Data
US 2018/0052260 A1 Feb. 22, 2018

Related U.S. Application Data

(60) Provisional application No. 62/120,015, filed on Feb. 24, 2015.

(51) Int. Cl.
*G02B 5/02* (2006.01)
*B32B 27/30* (2006.01)
(Continued)

(52) U.S. Cl.
CPC ............ *G02B 5/0242* (2013.01); *C08K 3/013* (2018.01); *C08K 3/22* (2013.01); *C08K 5/0041* (2013.01);
(Continued)

(58) Field of Classification Search
CPC . G02B 5/0242; B32B 27/308; B32B 2270/00; B32B 2307/414; C08K 3/013; C08K 13/02
See application file for complete search history.

(56) References Cited

U.S. PATENT DOCUMENTS

| 7,547,736 B2 | 6/2009 | Yang et al. |
| 8,163,827 B2 | 4/2012 | Garcia-Leiner et al. |

(Continued)

FOREIGN PATENT DOCUMENTS

| EP | 0 634 445 A1 | 1/1995 |
| WO | WO 2006/100126 | 9/2006 |
| WO | WO2014/055330 A2 | 4/2014 |

OTHER PUBLICATIONS

Polymer Refractive Indices from Scientific Polymer Products, Inc., downloaded from https://scientificpolymer.com/technical-library/refractive-index-of-polymers-by-index/ on Oct. 1, 2019.*

(Continued)

*Primary Examiner* — Vu A Nguyen
(74) *Attorney, Agent, or Firm* — Thoms F. Roland

(57) ABSTRACT

The invention relates to high efficiency diffusion lighting coverings useful in LED lighting applications. The diffusing lighting coverings are made of organic diffusing particles homogeneously dispersed in a transparent polymer matrix. The primary organic diffusing particles are refractive index mis-matched to the matrix polymer. The refractive index contrast between the polymer matrix and diffusion particles, and particle size are selected to provide a high efficiency (Continued)

(a)

(b)

(minimized particle loading). The high efficiency diffusion coverings provides excellent light diffusion, high hiding properties and high light transmission. The secondary diffusion particles may optionally be added to further improve selected target properties of the covering. Nano-sized ZnO inorganic particles may also function as diffusion particles and optical brighteners as well UV stabilizers. Articles made of this translucent composition are useful in commercial and residential lighting, motor vehicle illumination (lights, panels), street lighting, displays and signs, desktop monitors, and LCD/LED TVs.

19 Claims, 6 Drawing Sheets

(51) Int. Cl.
*C08K 3/00* (2018.01)
*C08K 13/02* (2006.01)
*C08K 3/013* (2018.01)
*C08K 3/22* (2006.01)
*C08K 5/00* (2006.01)
*C08K 5/11* (2006.01)
*C08K 13/04* (2006.01)
*C08L 13/00* (2006.01)

(52) U.S. Cl.
CPC .............. *C08K 5/11* (2013.01); *C08K 13/02* (2013.01); *C08K 13/04* (2013.01); *C08K 2003/2296* (2013.01); *C08K 2201/005* (2013.01); *C08K 2201/011* (2013.01); *C08L 13/00* (2013.01)

(56) References Cited

U.S. PATENT DOCUMENTS

| | | | |
|---|---|---|---|
| 8,357,744 B2* | 1/2013 | Garcia-Leiner | C08K 3/22 524/423 |
| 2004/0066645 A1* | 4/2004 | Graf | C08L 69/00 362/629 |
| 2005/0260422 A1 | 11/2005 | Hart et al. | |
| 2006/0240200 A1* | 10/2006 | Parusel | G02B 5/0221 428/23 |
| 2006/0270773 A1* | 11/2006 | Hale | C08K 5/0041 524/423 |
| 2007/0006565 A1 | 1/2007 | Fleischer et al. | |
| 2007/0060681 A1 | 3/2007 | Rudiger et al. | |
| 2009/0316261 A1* | 12/2009 | Garcia-Leiner | B32B 27/04 359/453 |
| 2010/0003501 A1 | 1/2010 | Liu et al. | |
| 2013/0100678 A1 | 4/2013 | Baxter et al. | |
| 2015/0267891 A1 | 9/2015 | Burchill et al. | |
| 2016/0084998 A1* | 3/2016 | Nakamura | G02B 5/0242 359/599 |

OTHER PUBLICATIONS

EP-A No. 16 756 141.4-1020 (Comments from third party).
Sersui Plastics Product Brochure.
Evonik's Plexiglas Sales Range Molding Compounds Technical Literature.
Seigrist et al, "Ulmann's Optical Brightners" 2012 Wiley.

* cited by examiner (a) (b)

(a) (b)

(a)

(b)

(a)

(b)

(a)

(b)

(a)

(b)

(a)

(b)

(a)

(b)

(a)

(b)

(a)

(b)

(a) (b)

HIGH EFFICIENCY DIFFUSION LIGHTING COVERINGS

This application claims benefit, under U.S.C. § 119 or § 365 of PCT Application No. PCT/US2016/019022, filed Feb. 23, 2016; and U.S. Provisional Application No. 62/120,015, filed Feb. 24, 2015; said applications incorporated herein by reference.

FIELD OF THE INVENTION

The invention relates to high efficiency diffusion lighting coverings useful in LED lighting applications. The diffusing lighting coverings are made of primary organic diffusing particles homogeneously dispersed in a transparent polymer matrix. The organic diffusing particles are refractive index mis-matched to the matrix polymer. The refractive index delta, and particle size are selected to provide a high efficiency (minimized particle loading). The high efficiency diffusion coverings/profiles provide excellent light diffusion, high hiding properties and high light transmission. Secondary diffusion particles may optionally be added to further improve selected target properties of the covering. Nano-sized ZnO inorganic particles may function as diffusion particles and optical brighteners as well as UV stabilizers. Articles made of this translucent composition are useful in commercial and residential lighting, motor vehicle illumination (lights, panels), street lighting, displays and signs.

BACKGROUND OF THE INVENTION

Polymer particles are used in a polymer matrix to manage light diffusion. For example, U.S. Pat. No. 7,547,736 describes the use of particles having an average particle size of 15 to 70 microns to provide a frosted look and textured surface, and U.S. Pat. No. 8,163,827 describes a high light transmission diffusion screen having inorganic pigments and refractive index-matched particles.

Point light sources create a visible shape of the light source, and there is often a desire to hide the light source shape, creating a more diffuse lighting. As used herein, "point light source" means any shaped source of electromagnetic radiation in the 3,600-7,700 Angstrom range. This includes, but is not limited to, incandescent, fluorescent, neon, argon and LED light sources.

Light emitting diodes (LEDs) are being increasingly favored as a light source, since they use far less electricity and produce higher luminous efficacy than standard incandescent or fluorescent light bulbs. LEDs provide a very bright, point light source, yet the output (when correlated color temperature CCT is close to 7000° K) often appears harsh and causes an uncomfortable glare. This is a challenge for lighting designers, as many applications demand an illumination and low glare. Light devices that integrate one or more LEDs include, for example, luminaires for commercial or residential lighting, motor vehicle illumination devices (at the front or rear), indicating panels, luminous displays, spotlights, street lighting, box-letters, etc.

These luminous devices typically consist of a light source and a cover (also called a lens or a diffuser) made of a plastic whose function is to mask and protect the light source, while still ensuring good transmission of the light emitted by the light source. The plastic may be colored or may have decorative elements or patterns. The cover also has the function of scattering the emitted light so that the illumination is softened and not dazzling. The scattering of the light emitted by the light source can be achieved by dispersing scattering particles of organic or mineral nature in the plastic.

Replacing a conventional light source with an LED results in a modification of the illumination. This is because an LED, especially an LED having a high luminous flux, exhibits directional illumination, whereas, for example the illumination of a neon tube is from 0 to 360°. In addition, the emission spectrum of an LED is completely different from that of a conventional light source.

WO 2006/100126 describes a thermoplastic cover with dispersed beads for use with LEDs to form luminous devices. 3-30% of scattering particles are dispersed in a transparent plastic. The particles can be inorganic or organic and have mean diameters of from 0.5 to 100 microns. There is no description of combinations of particle size and loading, and no teaching of hiding power.

The addition of scattering particles helps to soften the effect of the LED light source, but the scattering also reduces light transmission. Some LED lighting cover manufacturers add pigments, such as $BaSO_4$, $SiO_2$, $CaCO_3$, $AL_2O_3$, $TiO_2$ and ZnO (U.S. Pat. No. 4,418,986), to the cover to increase the hiding power, though this can dramatically decrease the light transmission. $BaSO_4$ and refractive-index-matched beads are used in a light diffusion (TV) screens in U.S. Pat. No. 8,163,827. Ground-up cell-cast sheet forms irregular particles with a wide particle size distribution, and unsatisfactory light transmission properties for LED diffusion sheets.

WO 14/055330 describes an attempt to balance the light transmission and hiding power for an LED diffuser, using a combination of different sized plastic beads.

There is a need to provide excellent transmission, haze and diffusion properties with a lower particle loading.

It has now surprisingly been found that high efficiency diffusion coverings (film, sheet and profiles) for use with LED point light sources can be achieved by careful selection of the organic particle size, thickness of the covering, and difference in refractive index between the organic particles and the transparent polymer matrix. By matching the particle characteristics to achieve a simulated (calculated) transmittance, the particles can be used in an efficient manner, with lower loadings for a given haze, transmission and light diffusion.

Selected properties of the high efficiency diffusion coverings can be further improved by the use of white pigment particles of a selected particle size and composition, and also by the use of optical brighteners.

SUMMARY OF THE INVENTION

The invention relates to a translucent, light-diffusing thermoplastic covering in which the particle size, covering thickness and refractive index difference between the organic particles and the transparent polymer matrix are selected to achieve a simulated (calculated) transmission with lower particle loadings, for a given haze, transmission and light diffusion. In addition, select inorganic particles can be added to further improve the diffusion properties of the covering.

The invention further relates to atranslucent, light-diffusing thermoplastic article comprising a blend composition of
  a) a thermoplastic polymer matrix material,
  b) from 0.01 to 10 weight percent of organic polymer diffusing particles that are refractive index (R.I.) mismatched to the matrix polymer, wherein the absolute difference between the matrix polymer and diffusing organic polymer particles is from greater than 0.02 to 0.15, c) from 0 to 15 weight percent of inorganic diffusing particles, wherein said weight percents based on the weight of the total light-diffusing composition, wherein a sheet or film has a luminous transmission of greater than 40%, an optical haze of greater than 95% and a diffuse light scattering of greater than 85%, and wherein the organic particles are selected to provide a simulated transmittance ($I/I_0$) of less than 0.5, preferably less than 0.4

The invention also relates to the use of the translucent, light-diffusion thermoplastic covering in an LED article.

DETAILED DESCRIPTION OF THE INVENTION

Figure 1:
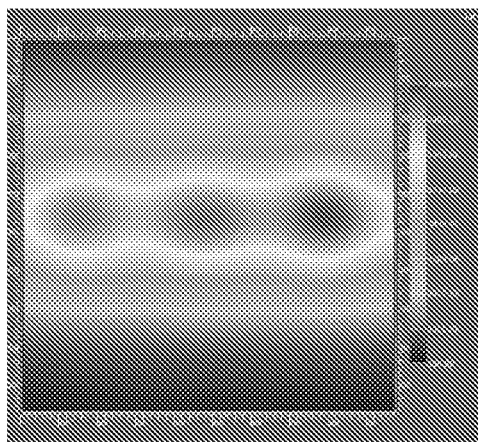
FIG. 1: Shows a 2D optical image of a 0.08" injection-molded diffusion sheet measured in Konica Minolta CA2500, in which the sheet was located at a). 0.5 inches and b). 1 inch away the LED light sources.
Figure 1:
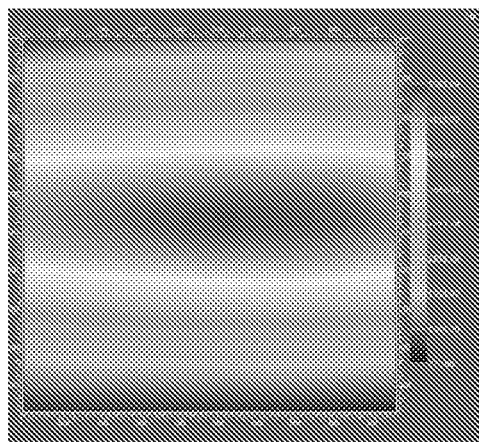

The invention relates to an optical diffusing covering made with an optimized level of organic diffusing (diffusion) particles, for use with point light sources. Careful selection of specified particle sizes, refractive index differences, covering thickness, and particle loadings are used to provide a balance of high light transmission and high hiding power. Optionally, inorganic diffusing particles and optical brighteners may also be added into the diffusing covering.

As used herein, unless otherwise described, percent shall mean weight percent.

Polymer Matrix

The coverings of the invention are composed of a transparent polymer matrix. The term "transparent polymer" denotes a thermoplastic or thermosetting polymeric material, having a light transmission in the visible range of at least 50%, preferably at least 70% and even more preferably at least 80% according to the DIN 67-507 standard (this is the light transmission of the transparent plastic with no scattering particle). Useful transparent plastics include, but are not limited to, crystal polystyrene; polyethylene terephthalate (PET); a transparent, especially clarified, polyolefin, for example clarified polypropylene; acrylics; a transparent polyamide; styrene acrylonitrile (SAN) and polycarbonate.

Acrylics, polystyrene, styrene acrylonitrile and polycarbonate are the preferred transparent plastics due to their ease of processing, commercial availability and high transparency. In addition, these two plastics exhibit excellent thermomechanical strength, allowing compact luminous devices to be produced. In the case of compact luminous devices, heat builds up and rapidly raises the temperature inside the device. While the energy efficiency of an LED (i.e. the efficiency of converting electrical energy into light energy) is much better than for an incandescent lamp, some of the energy is nevertheless converted into heat.

Acrylic polymers, as used herein, are meant to include polymers, and copolymers having two or more different monomer units that are formed from alkyl methacrylate and alkyl acrylate monomers, and mixtures thereof. The alkyl methacrylate monomer is preferably methyl methacrylate, which may make up from greater than 50 to 100 percent of the monomer mixture. 0 to less than 50 percent of other acrylate and methacrylate monomers or other ethylenically unsaturated monomers, included but not limited to, styrene, alpha methyl styrene, acrylonitrile, and crosslinkers at low levels may also be present in the monomer mixture. Suitable acrylate and methacrylate comonomers include, but are not limited to, methyl acrylate, ethyl acrylate and ethyl methacrylate, butyl acrylate and butyl methacrylate, iso-octyl methacrylate and iso-octyl acrylate, lauryl acrylate and lauryl methacrylate, stearyl acrylate and stearyl methacrylate, isobornyl acrylate and isobornyl methacrylate, methoxy ethyl acrylate and methoxy methacrylate, 2-ethoxy ethyl acrylate and 2-ethoxy ethyl methacrylate, and dimethylamino ethyl acrylate and dimethylamino ethyl methacrylate monomers. (Meth) acrylic acids such as methacrylic acid and acrylic acid can be useful for the monomer mixture. Most preferably the acrylic polymer is a copolymer having 70-99.5 weight percent and more preferably 80 to 99 percent of methyl methacrylate units and from 0.5 to 30 weight percent of one or more $C_{1-8}$ straight or branched alkyl acrylate units.

The acrylic polymer can be an alloy with one or more compatible polymers. Preferred alloys are PMMA/polyvinylidene fluoride (PVDF) alloys, and PMMA/polylactic acid (PLA) alloys The alloy contains 2 to 95 weight percent, preferably 5 to 90 weight percent, and more preferably 20-80 weight percent of the PMMA homopolymer or copolymer, and 5 to 98 weight percent, preferably 10 to 95 weight percent and more preferably 20 to 80 weight percent of the compatible polymer.

The transparent polymer matrix may contain additives, including impact modifiers, and other additives typically present in polymer formulations, including but not limited to, stabilizers, plasticizers, fillers, coloring agents, pigments, dyes, antioxidants, antistatic agents, surfactants, toner, refractive index matching additives, additives with specific light diffraction, light absorbing, or light reflection characteristics, and dispersing aids. In one embodiment, an additive is provided to help prevent degradation of the composition upon exposure to radiation, such as high levels of UV radiation or gamma radiation. Useful radiation stabilizers include, but are not limited to poly(ethylene glycol), poly (propylene glycol), butyl lactate, and carboxylic acids such as lactic acid, oxalic acid, acetic acid, or a mixture thereof.

Useful impact modifiers include block copolymers, graft copolymers, and core/shell impact modifiers that are refractive-index matched to the matrix polymer. The impact modifier may be present at a level of from 0 to 80 weight percent, preferably 5 to 45, and more preferably from 10 to 30 weight percent, based on the total layer of matrix polymer and all additives. The level of impact modifier can be adjusted to meet the toughness needs for the end use of the composition. Core-shell impact modifiers are multi-stage, sequentially-produced polymer having a core/shell particle structure of at least two layers. Preferentially, the core-shell modifier comprises three layers made of a hard core layer, one or more intermediate elastomeric layers, and a hard shell layer.

Organic Particles

The organic (polymeric) diffusing particles of the invention are spherical or near-spherical, have a mean particle size of either from 0.6 to 40 microns, preferably from 1 to 25 microns, and more preferably from 1 to 15 microns. Any particle size distribution can be used, though the particle size distribution is preferably relatively narrow, with 90 percent of the particles being within +/−50% of the mean particle size. The organic particles are present in the diffusing material at from 0.01 to 15 weight percent, preferably from 0.1 to 10 weight percent, and most preferably from 0.2 to 5 weight percent, based on the total weight of the diffusing material. A higher loading of particles generally provides an increase in hiding power, with a corresponding reduction in light transmission.

The particles must be spherical or near spherical to provide a good balance of diffusing properties and good light transmission. As an example, they can be formed from suspension or emulsion synthesis. Particles formed from the grinding of cast sheet will be irregular and will decrease performance.

The polymer diffusing particles may consist of a single composition and size, or may be a mixture of two or more different compositions and/or sizes. The particles may be homogeneous, or may be of a core-shell morphology with either a soft or a hard core.

The difference between the refractive indices (measured according to ASTM D 542) of the organic diffusing particles and of the transparent plastic should be greater than 0.02 and up to 0.3, preferably from 0.02 to 0.2, more preferably from 0.3 0.15, more preferably from 0.03 to 0.12 and more preferably between 0.03 and 0.10.

The diffusing particles maintain their shape and resist deformation under normal processing conditions of heat and pressure during incorporation into the polymer matrix and subsequent formation into articles. The particles can either be high Tg polymers, such as fluoropolymers or polyamides, or may be crosslinked polymer beads. Useful polymer particles of the invention include, but are not limited to, polyamide and copolyamide particles, styrene-based particles (comprising greater than 50 percent by weight styrene monomer units), silicone particles, polytetrafluoroethylene (PTFE) particles, polyvinylidene fluoride particles, and alkyl(meth)acrylate particles.

In one preferred embodiment, methyl methacrylate particles are used. These comprise greater than 50 weight percent, preferably greater than 70 weight percent, and more preferably greater than 80 weight percent methyl methacrylate units and 0.5 to 20 percent, preferably 1 to 10 percent, of a monomer possessing at least two $C=C$ double bonds acting as crosslinking agent. This may for example be 1,4-butanediol di(meth)acrylate, ethylene glycol di(meth) acrylate, tetraethylene glycol di(meth)acrylate, propylene glycol di(meth)acrylate, pentaerythritol tetra(meth)acrylate, allyl methacrylate or divinylbenzene. In another embodiment, acrylic copolymers containing a majority of butyl acrylate are used.

The crosslinked polymer based on methyl methacrylate or other alkyl(meth)acrylates advantageously includes from 0 to 20% of a comonomer having at least one ethylenic unsaturation copolymerizable with methyl methacrylate, chosen from styrene, alpha-methylstyrene, acrylonitrile, a $C_1$-$C_{10}$ alkyl(meth)acrylate, such as for example methyl acrylate, ethyl (meth)acrylate, butyl (meth)acrylate, benzyl (meth)acrylate, 2-hydroxyethyl (meth)acrylate and phenyl (meth)acrylate. Styrene, $\alpha$-methylstyrene, benzyl methacrylate and phenyl methacrylate are monomers of choice for modifying the refractive index of the methyl-methacrylate-based particles.

Useful methyl-methacrylate-based scattering particles are advantageously prepared by polymerization in a dispersed medium, such as suspension polymerization and emulsion polymerization, according to a recipe given for example in the document EP 1 022 115, US 2002/0123565 or US 2002/0123563. The methyl-methacrylate-based scattering particles are substantially spherical. The mean diameter of the particles can be adjusted during synthesis by adjusting parameters known to those skilled in the art, such as for example the stirring speed or the amount of suspension agent.

In one preferred embodiment, the polymer matrix and organic diffusing particles are R.I.-mismatched acrylic polymers.

The loading level of the organic diffusing particles is found to be most efficient when the particle size, covering and refractive index difference between the matrix polymer and the organic beads meets the conditions for simulated transmittance T ($I/I_0$) being less than 0.5 and preferably less than 0.4 using a modified Van de Hulst equation for a scattering coefficient (K). The calculated transmission can be determined from the refractive index of the diffusion particles (n), the refractive index of the matrix polymer ($n_0$), and the mean particle size ($d_p$) of the organic particles, where the thickness (z) is set at 3 mm, and the wavelength of measurement ($\lambda$) is set at 550 nm. Assumptions for the use of the equation in the present invention are:

a) Spherical or near-spherical particles with monodisperse or with a narrow polysdispersity particle size distribution.

b) n (diffusion particle) and $n_0$ (polymer matrix) differ by at least 0.02 The simulated transmission is $T(sim)=I/I_0=\exp(-\tau \cdot z)$, where I=transmitted light, $I_0$=incident light z is the thickness of the light diffusion cover, fixed at z=3 mm τ=turbidity (haze)=3/2 ø·K(ρ)/$d_p$ where
  ø=volume fraction of organic particles fixed at ø=0.05%
  K(ρ)=scattering coefficient=2-4/ρ sin ρ+4/ρ² (1−cos ρ) where
    ρ=|m−1| x; m=n/$n_0$; x=2π$d_p$$n_0$/λ.

Inorganic Particles

The diffusion can be further improved for select applications by optionally adding inorganic diffusing particles with the organic diffusing particles. The white inorganic diffusing particles aids in the diffusion of light. White inorganic diffusing particles (pigments) useful in the invention include, but are not limited to, barium sulfate, silicon dioxide, calcium carbonate, aluminum oxide, titanium dioxide, zinc oxide, silicates, natural and synthetic clay systems (aluminosilicates) for example montmorillonite, and mixtures thereof. Nano particles, such as nano zinc oxide are also anticipated by the invention, and could have particle sizes down to 10 nm.

The white pigment is preferably present in the light-diffusing covering at from 0.001 to 15 weight percent, preferably from 0.01 to 10 weight percent, and most preferably from 0.1 to 8 weight percent, based on the total light diffusing composition. The use of the inorganic particles, and use levels must be carefully balanced. The inorganic particles provide good light diffusion, however they also reduce light transmission.

The white pigment useful in the invention could include nano particles, and would preferably cover particle sizes large enough to diffuse the full visible light spectrum and avoid color emission. In general this would be an average particle size of at least 550 nanometers. The average particle size is less than 25 microns. Preferably the average particle size is from 0.6 to 20 microns and more preferably from 1 to 15 microns.

Brighteners

The diffusing covering of the invention may also optionally contain brighteners. The brighteners may be used with the organic diffusion particles alone, or may be combined with both inorganic and organic diffusing particles into a diffusing cover. The addition of small amounts of brighteners, can significantly improve the color of the diffused light transmitted through the diffusing covering of the invention.

Useful brighteners are those white pigments with particle sizes in the nanoscale range. Particles in the 2 nm to 5 microns average particle size are especially useful. Examples of nano/micro-scale brighteners useful in the invention include, but are not limited to nano titanium dioxide, and nano zinc oxide compounds, including but not limited to nano zinc oxide, zinc borate.

The brighteners are present in the composition of the diffusing material at from 0.00001 to 1 weight percent, preferably from 0.0001-0.5 weight percent, and more preferably from 0.001 to 0.1 weight percent, based on the weight of the total diffusing composition.

UV Stabilizers

The compositions of the invention may optionally contain UV stabilizers. While these stabilizers are not needed for indoor use, they are highly advantageous in outdoor applications. The UV stabilizers could be organic, inorganic, or a combination thereof. Useful UV stabilizers are those known in the art. In one embodiment, nano zinc oxide can simultaneously act as a diffusion particle, a brightener, and a UV stabilizer.

Processing

The composition of the invention is formed by blending the matrix polymer, organic diffusing particles, and optional inorganic diffusing particles and brighteners with other additives to form the light-diffusing composition. Additives useful in the covering of the invention include those additives typically used in polymer films and sheets, including but not limited to dye(s), impact modifiers, UV stabilizer, antioxidant, etc. The components may be blended by means known in the art. In one embodiment, the various components are melt compounded in an extruder. Two or more of the components could be physically pre-blended, followed by blending in the melt stage. The composition can then be extruded or injection/compression molded directly into articles, or into sheets, films, profiles, or pellets that can be further processed into articles.

The light diffusing composition could be used as a monolithic sheet or article, or can be co-extruded (or laminated or otherwise adhered) with other thermoplastics to form a light-diffusing composite. The light-diffusing sheet could be used to form a middle (or inner) layer of a multi-layer sheet, or may form both outer layers of a sheet having three or more layers. Diffusion films of the invention are in the thickness range of from 25 microns to 500 microns, preferably from 40 microns to 300 microns. A sheet or profile of the composition of the invention could be from 0.5 to 5 mm in thickness.

The diffusing material of the invention is translucent, and will have a luminous (optical) transmission of greater than 40%; an optical haze of greater than 90%, and a diffuse light scattering of greater than 85%. Preferably, the diffusing materials will have a luminous transmission of greater than 45%; an optical haze of greater than 95%, and a diffuse light scattering of greater than 90%. The parameters of percent loading, types of particles, and material thickness can be adjusted, as would be known in the art. For example, a thicker material could have a lower particle loading, and still have the same overall transmission, haze and light scattering of a thinner material with higher loading.

There are several methods known to those skilled in the art for producing the diffusion covering material of the invention. The organic particles and optional other particles and additives are mixed with the transparent plastic matrix polymer by means of an extruder or any other mixing tool suitable for thermoplastics as known to those skilled in the art. Recovered at the exit of the extruder are granules that are then formed to the desired shape using a conversion technique for thermoplastics, for example injection molding or compression molding. It is also possible to adapt the extruder in order to produce a sheet. This sheet is then formed to the desired shape after cutting and/or thermo-forming.

The covering may have a variety of different geometries, depending on the nature of the intended application. For example, it may be in the form of a flat, curved or domed sheet, whether rectangular or circular, in the form of a disc, etc. It may also take the form of a letter of the alphabet or of any other sign or symbol in the case of an illuminated sign.

The covering generally has a thickness of between 0.025 and 15 mm, preferably between 0.050 and 10 mm, more preferably between 0.075 and 5 mm and even more preferably between 0.1 and 3 mm A thin film could be used as a covering, such as in a flexible film structure hanging below a point light source as a room lighting, for example as a curved film. Thicker covers may be injection molded, or thermoformed into a variety of shapes. One of ordinary skill in the art can imagine many ways to form the cover composition of the invention into a useful diffusion covering.

The articles of the invention have correlated color temperatures (CCTs) of between 3500 to 5200° Kelvin, and preferably of between 3900 to 4800° Kelvin when the LED light source possess the CCT of 4420° Kelvin.

Uses

The composition of the invention is used to form a covering for a point light source. The light source plus cover forms a luminous device. The cover may be a single layer, or may be a multi-layer structure. The cover is separated from the light source by a distance of between 0.5 and 40 cm, preferably between 1 and 30 cm, preferably between 2 and 20 cm and even more preferably between 3 and 10 cm.

The luminous device according to the invention has a variety of applications such as, for example:
- interior lighting (living room lamps, office lamps, etc.);
- advertising displays;
- illuminated signs (in this case, the cover may especially have the form of a letter, a number, a symbol or any other sign); and
- automobile lighting (for example the luminous device may be a headlamp, a daytime light, a direction indicator, a stop light, a fog lamp, reversing light, etc.)
- backlighting units in desktop monitors and LCD TVs

EXAMPLES

A Konica Minolta CA-2500 CCD 2D Color Analyzer was used to accurately measure 2D optical luminance Lv (brightness), luminance distribution, chromaticity distribution, dominant wavelength, and CCT from LED illuminated diffusion sheets for LED lighting applications. It is extremely sensitive to identify "hot spots" created from LED illuminated diffusion sheets in direct LED lighting. The "hot spots" suppression becomes critical towards the success of diffusion sheet/profile designs, which is associated with the optimization of diffusion resin formulations, thickness, LED light source location, and others in any LED lighting design.

Example 1 (2 wt. % SMX-5R in V045-100 PMMA)

A diffusing product containing 2 wt. % of Sum SMX-5R (n=1.555, from Sekisui) in Plexiglas® V045-100 and 4.7% of DR101 impact modified grade was compounded and injection molded into the plaques ranged from 0.030" to 0.125" in thickness, using 90T injection molder with a die temperature of 230° C. The melt flow rate of the pellets was measured at 1.7 g/10 minutes at 230° C./3.8 kg.

The optical haze values from the variable thickness samples were measured at ~100% (saturated). The luminous transmission was measured over 50.0% at the thickness of 0.125" and less. The diffuse light scattering from the sample at a 2-inch distance away from the detector was measured over 90% when the thickness was at 0.060" and higher.

The data is compiled in Table 1-1:

TABLE 1-1

Optical performance data

| Thickness | Haze | L* | a* | b* | YI-E313 | Y | T(0)%: 0 inch | T(2)%: 2 inch | [T(0) − T(2)]/T(0) |
|---|---|---|---|---|---|---|---|---|---|
| 0.030" | 99.7 | 96.96 | 0.14 | −0.38 | −0.62 | 92.342 | 88.225 | 18.828 | 78.66% |
| 0.040" | 101.0 | 95.37 | 0.15 | 0.72 | 1.50 | 88.493 | 83.343 | 11.509 | 86.19% |
| 0.060" | 101.0 | 92.70 | 0.23 | 2.03 | 4.15 | 82.282 | 76.49 | 7.5521 | 90.13% |
| 0.080" | 101.0 | 89.34 | 0.36 | 2.96 | 6.24 | 74.878 | 68.813 | 5.386 | 92.17% |
| 0.100" | 102.0 | 86.06 | 0.48 | 3.47 | 7.57 | 68.105 | 61.99 | 4.2175 | 93.20% |
| 0.125" | 102.0 | 82.18 | 0.59 | 3.69 | 8.41 | 60.631 | 54.835 | 3.3735 | 93.85% |

A Konica Minolta CA2500 2D photometer was used to measure the luminance and luminance distribution from the LED illuminated diffusing sheets. The distance from LED light sources to the CA2500 2D detector lens was fixed at 12 inches. As shown in FIG. 1, a 0.08" injection molded plaque containing 2 wt. % 5 um SMX-5R diffusion beads exhibited marginal optical hiding performance from LED illuminated diffusion sheet, in which the sample was located only at 0.5 inches away from the LED light sources. The maximum luminance (10,656 cd/m$^2$), average luminance (4,099 cd/m$^2$), and CCT (4,506° K) were detected using a Konica Minolta CA2500 2D photometer, along with its sharp luminance distribution from the LED illuminated diffusion sheet. When the sample was moved to 1 inch away from the LED light sources, the maximum luminance (5,398 cd/m$^2$), average luminance (3,356 cd/m$^2$), and CCT (4,289° K) were detected, along with its broad luminance distribution from this 0.08" diffusion sheet under the same condition.

When the testing sample was closer to the LED light sources, the optical luminance and/or brightness [Lv (max.) and Lv. (ave.)] was increased. The optical hiding performance of LED hot spots was directly associated with the ratio of Lv. (max.)/Lv (ave.). When the ratio of Lv. (max.)/Lv (ave.) was near 1.6, as listed in Table 1-2, individual hot spots from the illuminated sheet were suppressed completely. The optical hiding performance was improved as the sample-to-LED distance was increased. The correlated color temperature (CCT) was distance-dependent in this sample. The CCT temperature changed from 4506° K in 0.5 inches away the LED light sources to 4185° K in 2 inches away the LED light sources, along with 4415~4425° K from original LED light sources without having a diffusion sheet.

TABLE 1-2

Optical luminance, luminance distribution and CCT performance data

| Distance (inch) | Lv(max. cd/m2) | Lv(ave. cd/m2) | Lv max/ Lv age | CCT (Kevin) | Comments |
|---|---|---|---|---|---|
| 0.5 | 10656 | 4099 | 2.5997 | 4506 | Marginal hot-spot suppression |
| 1 | 5398 | 3356 | 1.6085 | 4289 | Excellent hot-spot suppression |

TABLE 1-2-continued

Optical luminance, luminance distribution and CCT performance data

| Distance (inch) | Lv(max. cd/m2) | Lv(ave. cd/m2) | Lv max/ Lv age | CCT (Kevin) | Comments |
|---|---|---|---|---|---|
| 1.5 | 3712 | 2798 | 1.3267 | 4229 | Excellent hot-spot suppression |
| 2 | 2829 | 2338 | 1.2100 | 4185 | Excellent hot-spot suppression |

Example 2 (0.8 wt. % SMX-5R+5% BS110 in V045 PMMA)

A diffusing product containing 0.8 wt. % of Sum SMX-5R (n=1.555, from Sekisui) and 5 wt. % of 50 um Altuglas BS110 diffusion particles (n=1.52) in Plexiglas® V045-100 containing 1.7% of DR101 impact modified grade was compounded and injection molded into the plaques ranged from 0.030" to 0.125" in thickness, using 90T injection molder with a die temperature of 230° C. The melt flow rate of the pellets was measured at 1.9 g/10 minutes at 230° C./3.8 kg.

The optical haze values from the variable thickness samples were measured at 90~100% (saturated). The luminous transmission was measured over 70.0% at the thickness of 0.125" and less. The diffuse light scattering from the sample at a 2-inch distance away from the detector was measured over 85% when the thickness was at 0.080" and higher.

The data is compiled in Table 2-1

TABLE 2-1

Optical performance data

| Thickness | Haze | L* | a* | b* | YI-E313 | Y | T(0)%: 0 inch | T(2)%: 2 inch | [T(0) − T(2)]/T(0) |
|---|---|---|---|---|---|---|---|---|---|
| 0.030" | 91.6 | 97.55 | 0.12 | −1.08 | −1.95 | 93.807 | 91.102 | 42.757 | 53.07% |
| 0.040" | 97.4 | 97.33 | 0.11 | −0.68 | −1.21 | 93.250 | 90.013 | 28.658 | 68.16% |
| 0.060" | 99.8 | 96.35 | 0.08 | 0.26 | 0.56 | 90.853 | 86.82 | 17.612 | 79.71% |
| 0.080" | 101.0 | 94.93 | 0.09 | 1.29 | 2.55 | 87.446 | 82.833 | 12.344 | 85.10% |
| 0.100" | 101.0 | 93.03 | 0.13 | 2.41 | 4.79 | 83.029 | 77.92 | 8.8893 | 88.59% |
| 0.125" | 101.0 | 90.62 | 0.20 | 3.51 | 7.10 | 77.643 | 72.334 | 6.9553 | 90.38% |

Figure 2:
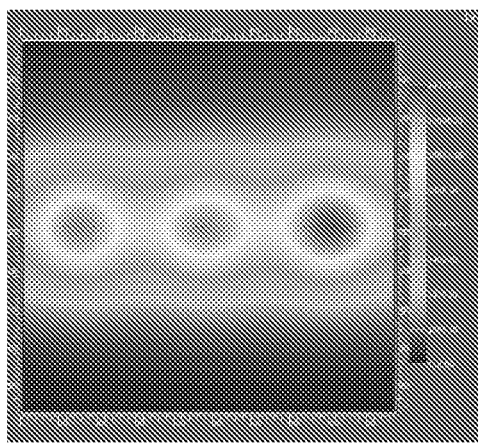
FIG. 2: Shows a 2D optical image of a 0.118" injection-molded diffusion sheet measured in Konica Minolta CA2500, in which the sheet was located at a). 0.5 inches and b). 1 inch away the LED light sources.
Figure 2:
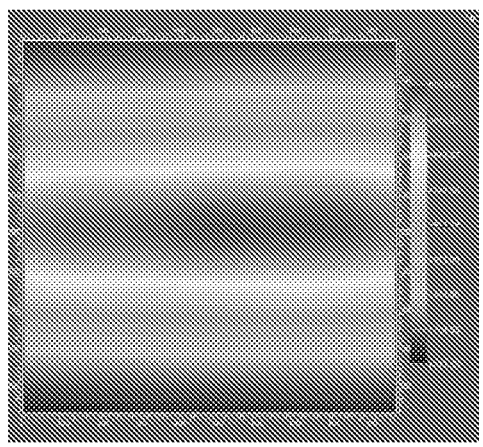

A Konica Minolta CA2500 2D photometer was used to measure the luminance and luminance distribution from the LED illuminated diffusing sheets. The distance from LED light sources to the CA2500 2D detector lens was fixed at 12 inches. As shown in FIG. 2, a 0.118" extruded texture sheet possessed the textured surface with 6 GU at the incident angle of 20°, 29 GU at 60°, and 31 GU at 85°. The sheet sample exhibited insufficient optical hiding performance from LED illuminated diffusion sheet, in which the sample was located only at 0.5 inches away from the LED light sources. The maximum luminance (14,379 cd/m²), average luminance (4,188 cd/m²), and CCT (4,723° K) were detected using a Konica Minolta CA2500 2D photometer, along with its sharp luminance distribution from the LED illuminated diffusion sheet. When the sample was moved to 1 inch away from the LED light sources, the maximum luminance (6,153 cd/m²), average luminance (3,624 cd/m²), and CCT (4,341° K) were detected, along with its broad luminance distribution from this 0.08" diffusion sheet.

When the testing sample was closer to the LED light sources, the optical luminance and/or brightness [Lv (max.) and Lv. (ave.)] was increased. The optical hiding performance of LED hot spots was directly associated with the ratio of Lv. (max.)/Lv (ave.). When the ratio of Lv. (max.)/Lv (ave.) was near 1.7, as listed in Table 2-2, three individual hot spots from the illuminated sheet were suppressed completely. The optical hiding performance was improved as the sample-to-LED distance was increased. The correlated color temperature (CCT) was distance-dependent in this sample. The CCT temperature changed from 4723° K in 0.5 inches away the LED light sources to 4175° K in 2 inches away the LED light sources, along with 4415~4425° K from original LED light sources without having a diffusion sheet.

TABLE 2-2

Optical luminance, luminance distribution and CCT performance data

| Distance (inch) | Lv(max. cd/m2) | Lv(ave. cd/m2) | Lv max/ Lv age | CCT (Kevin) | Comments |
|---|---|---|---|---|---|
| 0.5 | 14379 | 4188 | 3.4334 | 4723 | Insufficient hot-spot suppression |
| 1 | 6153 | 3624 | 1.6978 | 4341 | Excellent hot-spot suppression |
| 1.5 | 4236 | 3072 | 1.3789 | 4226 | Excellent hot-spot suppression |
| 2 | 3235 | 2602 | 1.2433 | 4175 | Excellent hot-spot suppression |

Example 3 (2 wt. % SMX-5R+0.02 wt. % Nano ZnO in pMMA

A diffusing product containing 2 wt. % of Sum SMX-5R (n=1.555, from Sekisui) and 0.02 wt. % Nano ZnO Nanotek (n=2.0, non-modified ZnO with the spherical and elongated particle size of 10-150 nm from Alfa Aesar) in Plexiglas® V045-100 grade was compounded and injection molded into the plaques ranged from 0.030" to 0.125" in thickness, using 90T injection molder with a die temperature of 230 C. The melt flow rate of the pellets was measured at 1.9 g/10 minutes at 230° C./3.8 kg.

The optical haze values from the variable thickness samples were measured at ~100% (saturated). The luminous transmission was measured over 55.0% at the thickness of 0.125" and less. The diffuse light scattering from the sample at a 2-inch distance away from the detector was measured over 90% when the thickness was at 0.080" and higher.

The data is compiled in Table 3-1

TABLE 3-1

| | | | | | | | | | |
|---|---|---|---|---|---|---|---|---|---|
| | Optical performance data | | | | | | | | |
| Thickness | Haze | L* | a* | b* | YI-E313 | Y | T(0)%: 0 inch | T(2)%: 2 inch | [T(0) − T(2)]/T(0) |
| 0.030" | 99.1 | 96.71 | 0.12 | 0.01 | 0.10 | 91.725 | 88.2 | 21.639 | 75.47% |
| 0.040" | 100.0 | 95.65 | 0.17 | 0.94 | 1.94 | 89.164 | 84.858 | 14.2 | 83.27% |
| 0.060" | 101.0 | 92.59 | 0.35 | 2.70 | 5.54 | 82.041 | 76.987 | 8.1137 | 89.46% |
| 0.080" | 101.0 | 89.43 | 0.57 | 3.76 | 7.95 | 75.071 | 69.897 | 5.7824 | 91.73% |
| 0.100" | 101.0 | 86.31 | 0.74 | 4.36 | 9.54 | 68.618 | 63.181 | 4.4636 | 92.94% |
| 0.125" | 102.0 | 82.49 | 0.90 | 4.76 | 10.88 | 61.207 | 56.461 | 3.6124 | 93.60% |

Figure 3:
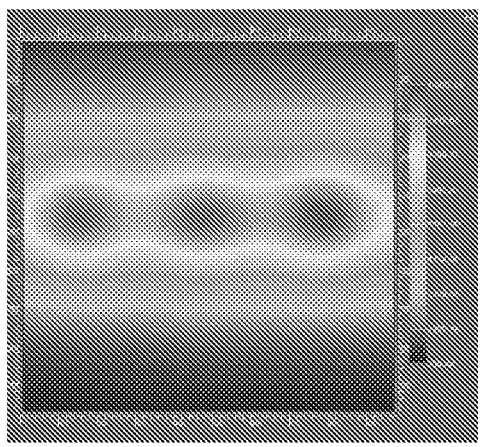
FIG. 3: Shows a 2D optical image of a 0.08" injection-molded diffusion sheet measured in Konica Minolta CA2500, in which the sheet was located at a). 0.5 inches and b). 1 inch away the LED light sources.
Figure 3:
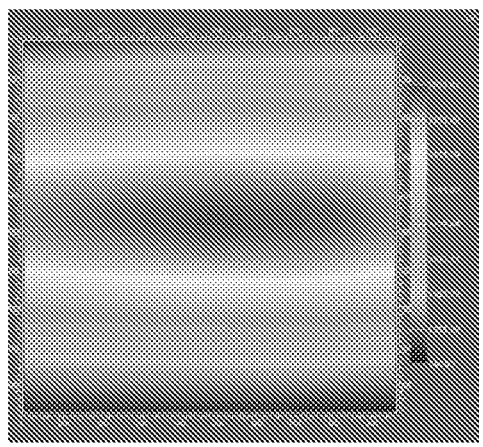

A Konica Minolta CA2500 2D photometer was used to measure the luminance and luminance distribution from the LED illuminated diffusing sheets. The distance from LED light sources to the CA2500 2D detector lens was fixed at 12 inches. As shown in FIG. 3, a 0.08" injection molded plaque containing 2 wt. % Sum SMX-5R diffusion beads and 0.02 wt. % Nano ZnO Nanotek (n=2.0, non-modified ZnO) exhibited marginal optical hiding performance from LED illuminated diffusion sheet, in which the sample was located only at 0.5 inches away from the LED light sources. The maximum luminance (10,995 cd/m$^2$), average luminance (4,154 cd/m$^2$), and CCT (4,519° K) were detected using a Konica Minolta CA2500 2D photometer, along with its sharp luminance distribution from the LED illuminated diffusion sheet. When the sample was moved to 1 inch away from the LED light sources, the maximum luminance (5,608 cd/m$^2$), average luminance (3,419 cd/m$^2$), and CCT (4,272° K) were detected, along with its broad luminance distribution from this 0.08" diffusion sheet.

When the testing sample was closer to the LED light sources, the optical luminance and/or brightness [Lv (max.) and Lv. (ave.)] was increased. The optical hiding performance of LED hot spots was directly associated with the ratio of Lv. (max.)/Lv (ave.). When the ratio of Lv. (max.)/Lv (ave.) was near 1.6, as listed in Table 3-2, individual hot spots from the illuminated plaque were suppressed completely. The optical hiding performance was improved as the sample-to-LED distance was increased. The correlated color temperature (CCT) was distance-dependent in this sample. The CCT temperature changed from 4519° K in 0.5 inches away the LED light sources to 4145° K in 2 inches away the LED light sources, along with 4415~4425° K from original LED light sources without having a diffusion sheet.

TABLE 3-2

| | | | | | |
|---|---|---|---|---|---|
| Optical luminance, luminance distribution and CCT performance data | | | | | |
| Distance (inch) | Lv(max. cd/m2) | Lv(ave. cd/m2) | Lv max/ Lv age | CCT (Kevin) | Comments |
| 0.5 | 10995 | 4099 | 2.6824 | 4519 | Insufficient hot-spot suppression |
| 1 | 5608 | 3419 | 1.6402 | 4276 | Excellent hot-spot suppression |
| 1.5 | 3895 | 2872 | 1.3562 | 4197 | Excellent hot-spot suppression |
| 2 | 2985 | 2425 | 1.2309 | 4145 | Excellent hot-spot suppression |

Example 4 (2 wt. % SMX-5R+0.02 wt. % Zinc Borate in V045 PMMA

A diffusing product containing 2 wt. % of Sum SMX-5R (n=1.555, from Sekisui), 0.02 wt. % zinc borate (n=1.58, 1-4 um lozenge-like shaped Zinc Borate from Lord's Additives) in Plexiglas® V045 was compounded and injection molded into the plaques ranged from 0.030" to 0.125" in thickness, using 90T injection molder with a die temperature of 230 C. The melt flow rate of the pellets was measured at 1.9 g/10 minutes at 230° C./3.8 kg.

The optical haze values from the variable thickness samples were measured at ~100% (saturated). The luminous transmission was measured over 55% at the thickness of 0.125" and less. The diffuse light scattering from the sample at a 2-inch distance away from the detector using Lambda 950 was measured near or higher than 90% when the thickness was at 0.060" and higher.

The data is compiled in Table 4-1.

TABLE 4-1

| | | | | | | | | | |
|---|---|---|---|---|---|---|---|---|---|
| | Optical performance data | | | | | | | | |
| Thickness | Haze | L* | a* | b* | YI-E313 | Y | T(0)%: 0 inch | T(2)%: 2 inch | [T(0) − T(2)]/T(0) |
| 0.030" | 99.3 | 96.88 | 0.13 | −0.22 | −0.32 | 92.143 | 88.36 | 19.628 | 77.79% |
| 0.040" | 100.0 | 95.76 | 0.19 | 0.64 | 1.36 | 89.423 | 84.958 | 13.35 | 84.29% |
| 0.060" | 101.0 | 92.74 | 0.35 | 2.24 | 4.65 | 82.368 | 77.226 | 7.8566 | 89.83% |
| 0.080" | 101.0 | 89.85 | 0.52 | 3.13 | 6.66 | 75.984 | 70.468 | 5.7218 | 91.88% |
| 0.100" | 101.0 | 86.56 | 0.69 | 3.82 | 8.41 | 69.113 | 63.95 | 4.5322 | 92.91% |
| 0.125" | 102.0 | 83.34 | 0.81 | 4.18 | 9.51 | 62.805 | 57.883 | 3.7419 | 93.54% |

Figure 4:
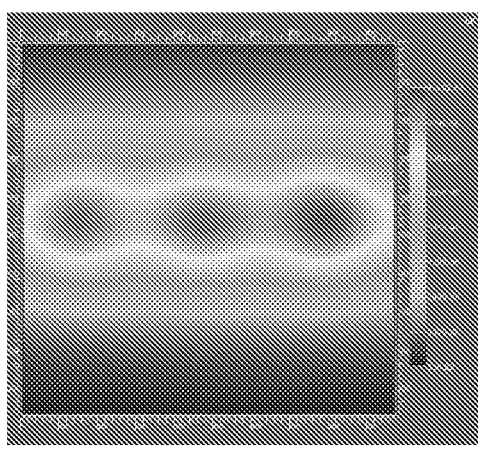
FIG. 4: Shows a 2D optical image of a 0.08" injection-molded diffusion sheet measured in Konica Minolta CA2500, in which the sheet was located at a). 0.5 inches and b). 1 inch away the LED light sources
Figure 4:
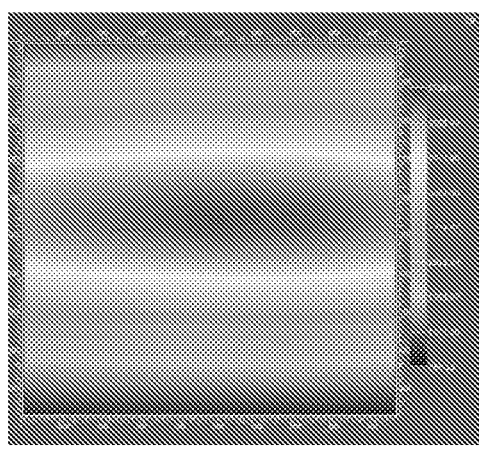

A Konica Minolta CA2500 2D photometer was used to measure the luminance and its luminance distribution from the LED illuminated diffusing sheets. The distance from LED light sources to the CA2500 2D detector lens was fixed at 12 inches. As shown on FIG. 4 a 0.08" injection molded plaque containing the mixture of 2 wt. % 5 um SMX-5R, and 0.02% zinc borate exhibited marginally good optical hiding performance from LED illuminated diffusion sheet, in which the sample was located only at 0.5 inches away from the LED light sources. The maximum luminance (11,102 cd/m$^2$), average luminance (4,173 cd/m$^2$), and CCT (4,513° K) were detected using a Konica Minolta CA2500 2D photometer, along with its luminance distribution from the LED illuminated diffusion sheet. When the sample was moved to 1 inch away from the LED light sources, the maximum luminance (5,709 cd/m$^2$), average luminance (3,452 cd/m$^2$), and CCT (4,298° K) were detected, along with its very good "hot-spot" hiding and broad luminance distribution from this 0.08" thin diffusion sheet.

When the testing sample was closer to the LED light sources, the optical luminance and/or brightness [Lv (max.) and Lv. (ave.)] was increased. The optical hiding performance of LED hot spots was directly associated with the ratio of Lv. (max.)/Lv (ave.). When the ratio of Lv. (max.)/Lv (ave.) was near 1.7, as listed in Table 4-2, individual hot spots from the illuminated sheet were suppressed completely. The optical hiding performance was improved as the sample-to-LED distance was increased. The correlated color temperature (CCT) was distance-dependent in this sample. The CCT temperature changed from 4513° K in 0.5 inches away the LED light sources to 4176° K in 2 inches away the LED light sources, compared to 4415~4425° K from original LED light sources without having a diffusion sheet.

TABLE 4-2

Optical luminance, luminance distribution and CCT performance data

| Distance (inch) | Lv(max. cd/m2) | Lv(ave. cd/m2) | Lv max/ Lv age | CCT (Kevin) | Comments |
|---|---|---|---|---|---|
| 0.5 | 11102 | 4173 | 2.6604 | 4513 | Insufficient hot-spot suppression |
| 1 | 5709 | 3452 | 1.6538 | 4298 | Excellent hot-spot suppression |
| 1.5 | 3930 | 2889 | 1.3603 | 4222 | Excellent hot-spot suppression |
| 2 | 3009 | 2440 | 1.2332 | 4176 | Excellent hot-spot suppression |

Example 5 (2 wt. % SMX-5R+0.02 wt. % Nano ZnO C1 in V045 PMMA)

A diffusing product containing 1 wt. % of Sum SMX-5R (n=1.555, from Sekisui), and 0.02 wt. % Nano ZnO Nanotek C1 (n=2.0, nonpolar organo-silane modified ZnO with the elongated particle size of about 10-150 nm from Alfa Aesar) in Plexiglas® V045 was compounded and injection molded into the plaques ranged from 0.030" to 0.125" in thickness, using 90T injection molder with a die temperature of 230° C. The melt flow rate of the pellets was measured at 1.9 g/10 minutes at 230° C./3.8 kg.

The optical haze values from the variable thickness samples were measured at ~100% (saturated). The luminous transmission was measured over 55% at the thickness of 0.125" and less. The diffuse light scattering from the sample at a 2-inch distance away from the detector using Lambda 950 was measured at over 88% when the thickness was at 0.060" and higher.

The data is compiled in Table 5-1.

TABLE 5-1

Optical performance data

| Thickness | Haze | L* | a* | b* | YI-E313 | Y | T(0)%: 0 inch | T(2)%: 2 inch | [T(0) − T(2)]/T(0) |
|---|---|---|---|---|---|---|---|---|---|
| 0.030" | 98.6 | 96.77 | 0.11 | −0.04 | 0.02 | 91.878 | 88.213 | 22.538 | 74.45% |
| 0.040" | 100.0 | 95.81 | 0.15 | 0.90 | 1.83 | 89.553 | 85.303 | 14.989 | 82.43% |
| 0.060" | 101.0 | 93.05 | 0.30 | 2.60 | 5.29 | 83.090 | 78.142 | 8.686 | 88.88% |
| 0.080" | 101.0 | 89.94 | 0.52 | 3.80 | 7.96 | 76.174 | 71.051 | 6.1202 | 91.39% |
| 0.100" | 101.0 | 86.86 | 0.70 | 4.53 | 9.80 | 69.725 | 64.293 | 4.6796 | 92.72% |
| 0.125" | 102.0 | 83.11 | 0.87 | 5.04 | 11.36 | 62.372 | 57.33 | 3.7547 | 93.45% |

Figure 5:
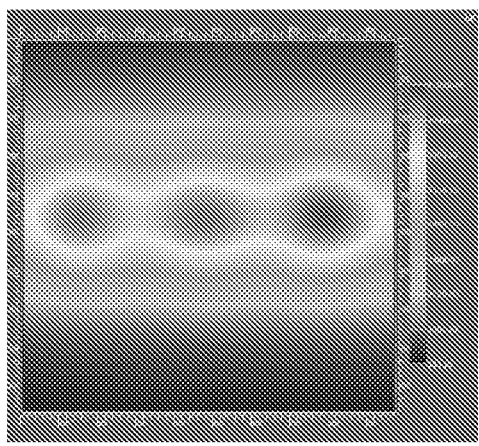
FIG. 5: shows a 2D optical image of a 0.08" injection-molded diffusion sheet measured in Konica Minolta CA2500, in which the sheet was located at a). 0.5 inches and b). 1 inch away the LED light sources.
Figure 5:
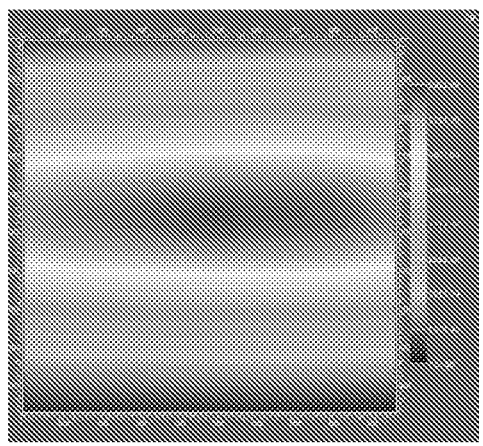

A Konica Minolta CA2500 2D photometer was used to measure the luminance and luminance distribution from the LED illuminated diffusing sheets. The distance from LED light sources to the CA2500 2D detector lens was fixed at 12 inches. As shown on FIG. 5, a 0.08" injection molded plaque containing the mixture of 2 wt. % Sum SMX-5R, and 0.02% nano ZnO NanoTek C1 exhibited marginal optical hiding performance from LED illuminated diffusion sheet, in which the sample was located only at 0.5 inches away from the LED light sources. The maximum luminance (11,930 cd/m$^2$), average luminance (4,210 cd/m$^2$), and CCT (4,560° K) were detected using a Konica Minolta CA2500 2D photometer, along with its luminance distribution from the LED illuminated diffusion sheet. When the sample was moved to 1 inch away from the LED light sources, the maximum luminance (5,901 cd/m$^2$), average luminance (3,498 cd/m$^2$), and CCT (4,287° K) were detected, along with its broad luminance distribution from this 0.08" diffusion sheet.

When the testing sample was closer to the LED light sources, the optical luminance and/or brightness [Lv (max.) and Lv. (ave.)] was increased. The optical hiding performance of LED hot spots was directly associated with the ratio of Lv. (max.)/Lv (ave.). When the ratio of Lv. (max.)/Lv (ave.) was near 1.7, as listed in Table 5-2, individual hot spots from the illuminated sheet were suppressed completely. The optical hiding performance was improved as the sample-to-LED distance was increased. The correlated color temperature (CCT) was distance-dependent in this sample. The CCT temperature changed from 4560° K in 0.5 inches away the LED light sources to 4146° K in 2 inches away the LED light sources, compared to 4415~4425° K from original LED light sources without having a diffusion sheet.

TABLE 5-2

Optical luminance, luminance distribution and CCT performance data

| Distance (inch) | Lv(max. cd/m2) | Lv(ave. cd/m2) | Lv max/ Lv age | CCT (Kevin) | Comments |
|---|---|---|---|---|---|
| 0.5 | 11930 | 4210 | 2.8337 | 4560 | Insufficient hot-spot suppression |
| 1 | 5901 | 3498 | 1.6870 | 4287 | Excellent hot-spot suppression |
| 1.5 | 4070 | 2947 | 1.3811 | 4196 | Excellent hot-spot suppression |
| 2 | 3140 | 2508 | 1.2520 | 4146 | Excellent hot-spot suppression |

Example 6 (2 wt. % SMX-5R+0.02 wt. % Nano ZnO C2 in V045 PMMA)

A diffusing product containing 2 wt. % of Sum SMX-5R (n=1.555, from Sekisui), and 0.02 wt % Nano ZnO Nanotek C2 (n=2.0, polar organo-silane modified ZnO) with the spherical and elongated particle size of about 10-150 nm from Alfa Aesar) in Plexiglas® V045 was compounded and injection molded into the plaques ranged from 0.030" to 0.125" in thickness, using 90T injection molder with a die temperature of 230° C. The melt flow rate of the pellets was measured at 1.9 g/10 minutes at 230° C./3.8 kg.

The optical haze values from the variable thickness samples were measured at ~100% (saturated). The luminous transmission was measured over 55% at the thickness of 0.125" and less. The diffuse light scattering from the sample at a 2-inch distance away from the detector using Lambda 950 was measured over 89% when the thickness was at 0.060" and higher.

The data is compiled in Table 6-1.

TABLE 6-1

Optical performance data

| Thickness | Haze | L* | a* | b* | YI-E313 | Y | T(0)%: 0 inch | T(2)%: 2 inch | [T(0) − T(2)]/T(0) |
|---|---|---|---|---|---|---|---|---|---|
| 0.030" | 98.5 | 96.91 | 0.11 | −0.16 | −0.23 | 92.226 | 88.663 | 23.83 | 73.12% |
| 0.040" | 100.0 | 95.79 | 0.16 | 0.88 | 1.80 | 89.506 | 85.44 | 15.084 | 82.35% |
| 0.060" | 101.0 | 92.92 | 0.30 | 2.66 | 5.41 | 82.787 | 77.88 | 8.587 | 88.97% |
| 0.080" | 101.0 | 89.95 | 0.53 | 3.73 | 7.83 | 76.193 | 71.145 | 6.0802 | 91.45% |
| 0.100" | 101.0 | 86.71 | 0.71 | 4.46 | 9.68 | 69.423 | 64.407 | 4.6914 | 92.72% |
| 0.125" | 102.0 | 82.71 | 0.89 | 4.98 | 11.29 | 61.624 | 57.403 | 3.7542 | 93.46% |

Figure 6:
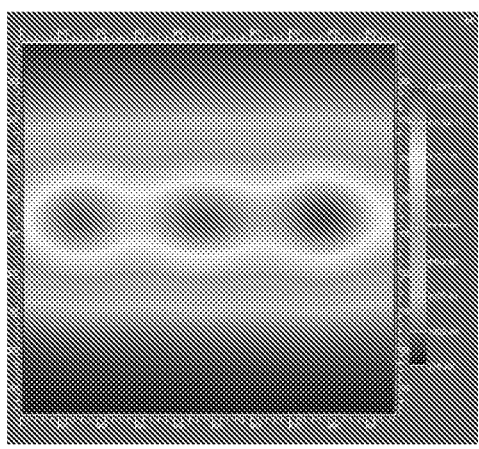
FIG. 6: Shows a 2D optical image of a 0.08" injection-molded diffusion sheet measured in Konica Minolta CA2500, in which the sheet was located at a). 0.5 inches and b). 1 inch away the LED light sources.
Figure 6:
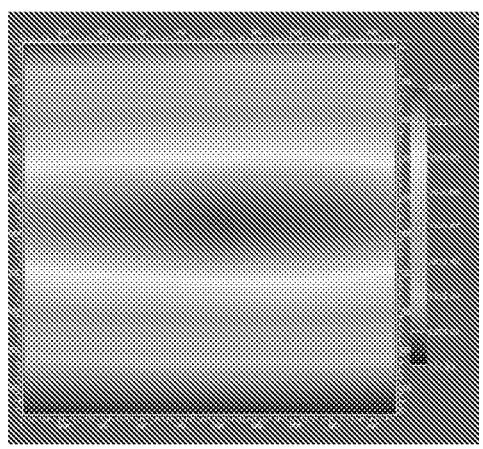

A Konica Minolta CA2500 2D photometer was used to measure the luminance and its luminance distribution from the LED illuminated diffusing sheets. The distance from LED light sources to the CA2500 2D detector lens was fixed at 12 inches. As shown on FIG. 6, a 0.08" injection molded plaque containing the mixture of 2 wt. % Sum SMX-5R diffusion beads, and 0.02% nano ZnO NanoTek C2 exhibited marginal optical hiding performance from LED illuminated diffusion sheet, in which the sample was located only at 0.5 inches away from the LED light sources. The maximum luminance (11,577 cd/m$^2$), average luminance (4,210 cd/m$^2$), and CCT (4,539° K) were detected using a Konica Minolta CA2500 2D photometer, along with its luminance distribution from the LED illuminated diffusion sheet. When the sample was moved to 1 inch away from the LED light sources, the maximum luminance (5,862 cd/m$^2$), average luminance (3,494 cd/m$^2$), and CCT (4,290° K) were detected, along with its broad luminance distribution from this 0.08" diffusion sheet.

When the testing sample was closer to the LED light sources, the optical luminance and/or brightness [Lv (max.) and Lv. (ave.)] was increased. The optical hiding performance of LED hot spots was directly associated with the ratio of Lv. (max.)/Lv (ave.). When the ratio of Lv. (max.)/Lv (ave.) was near 1.7, as listed in Table 6-2, individual hot spots from the illuminated sheet were suppressed completely. The optical hiding performance was improved as the sample-to-LED distance was increased. The correlated color temperature (CCT) was distance-dependent in this sample. The CCT temperature changed from 4539° K in 0.5 inches away the LED light sources to 4146° K in 2 inches away the LED light sources, compared to 4415~4425° K from original LED light sources without having a diffusion sheet.

TABLE 6-2

Optical luminance, luminance distribution and CCT performance data

| Distance (inch) | Lv(max. cd/m2) | Lv(ave. cd/m2) | Lv max/ Lv age | CCT (Kevin) | Comments |
|---|---|---|---|---|---|
| 0.5 | 11577 | 4210 | 2.7499 | 4539 | Insufficient hot-spot suppression |
| 1 | 5862 | 3494 | 1.6777 | 4290 | Excellent hot-spot suppression |
| 1.5 | 4019 | 2940 | 1.3670 | 4204 | Excellent hot-spot suppression |
| 2 | 3125 | 2500 | 1.2500 | 4146 | Excellent hot-spot suppression |

Example 7 (1.5 wt. % SMX-5R+8% BaSO4 in DR101 PMMA)

A diffusing product containing 1.5 wt. % of Sum SMX-5R (n=1.555, from Sekisui) and 8 wt. % of 3 um BaSO4 diffusion particles (n=1.64) in Plexiglas® DR101 impact modified grade was compounded and injection molded into the plaques ranged from 0.030" to 0.125" in thickness, using 90T injection molder with a die temperature of 230° C. The melt flow rate of the pellets was measured at 1.4 g/10 minutes at 230° C./3.8 kg.

The optical haze values from the variable thickness samples were measured at ~100% (saturated). The luminous transmission was measured over 40.0% at the thickness of 0.06" and less. The diffuse light scattering from the sample at a 2-inch distance away from the detector was measured over 95% when the thickness was at 0.030" and higher.

The data is compiled in Table 7-1

TABLE 7-1

Optical performance data

| Thickness | Haze | L* | a* | b* | YI-E313 | Y | T(0)%: 0 inch | T(2)%: 2 inch | [T(0) − T(2)]/T(0) |
|---|---|---|---|---|---|---|---|---|---|
| 0.030" | 101.0 | 81.48 | 0.38 | 0.80 | 2.09 | 59.339 | 54.044 | 2.594 | 95.20% |
| 0.040" | 102.0 | 78.52 | 0.35 | 1.13 | 2.86 | 54.101 | 50.211 | 2.3021 | 95.42% |
| 0.060" | 101.0 | 72.95 | 0.33 | 1.95 | 4.96 | 45.091 | 42.52 | 1.9278 | 95.47% |
| 0.080" | 101.0 | 68.28 | 0.32 | 2.73 | 7.16 | 38.359 | 37.016 | 1.6932 | 95.43% |
| 0.100" | 101.0 | 63.61 | 0.32 | 3.51 | 9.56 | 32.324 | 32.112 | 1.4842 | 95.38% |
| 0.125" | 101.0 | 58.78 | 0.33 | 4.24 | 12.17 | 26.790 | 27.741 | 1.3156 | 95.26% |

Figure 7:
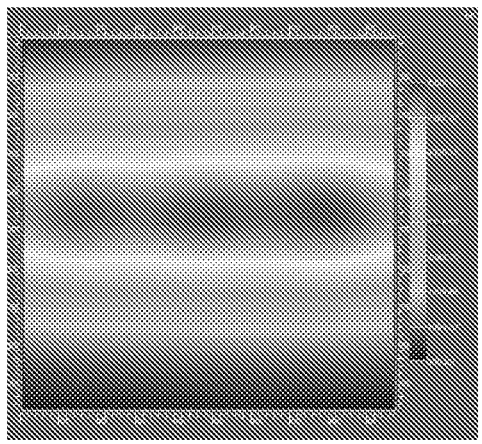
FIG. 7: Shows a 2D optical image of a 0.03" injection-molded diffusion sheet measured in Konica Minolta CA2500, in which the sheet was located at a). 0.5 inches and b). 1 inch away the LED light sources.
Figure 7:
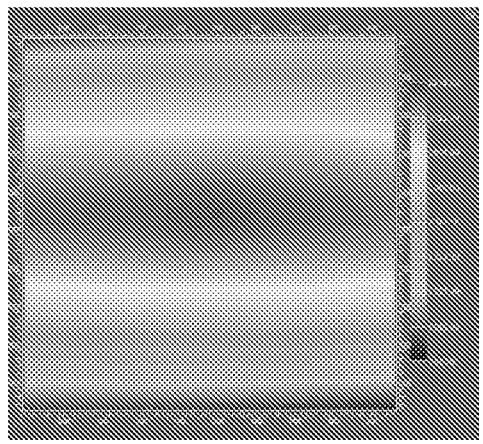

A Konica Minolta CA2500 2D photometer was used to measure the luminance and luminance distribution from the LED illuminated diffusing sheets. The distance from LED light sources to the CA2500 2D detector lens was fixed at 12 inches. As shown in FIG. 7, a 0.03" injection molded plaque containing the mixture of 1.5 wt. % 5 um SMX-5R and 8% 3 um BaSO4 diffusion beads exhibited quite good optical hiding performance from LED illuminated diffusion sheet, in which the sample was located only at 0.5 inches away from the LED light sources. The maximum luminance (6,337 cd/m$^2$), average luminance (3,080 cd/m$^2$), and CCT (4,360° K) were detected using a Konica Minolta CA2500 2D photometer, along with its luminance distribution from the LED illuminated diffusion sheet. When the sample was moved to 1 inch away from the LED light sources, the maximum luminance (3,348 cd/m$^2$), average luminance (2,389 cd/m$^2$), and CCT (4,358° K) were detected, along with its broad luminance distribution from this 0.03" diffusion plaque.

When the 0.03" testing sample was closer to the LED light sources, the optical luminance and/or brightness [Lv (max.) and Lv. (ave.)] was increased. The optical hiding performance of LED hot spots was directly associated with the ratio of Lv. (max.)/Lv (ave.). When the ratio of Lv. (max.)/Lv (ave.) was near 2.1, as listed in Table 7-2, individual hot spots from the illuminated plaque were suppressed completely. The optical hiding performance was improved as the sample-to-LED distance was increased. The correlated color temperature (CCT) was distance-dependent in this sample. The CCT temperature changed from 4363° K in 0.5 inches away the LED light sources to 4349° K in 2 inches away the LED light sources, compared to 4415~4425° K from original LED light sources without having a diffusion sheet.

TABLE 7-2

Optical luminance, luminance distribution and CCT performance data

| Distance (inch) | Lv(max.) cd/m2 | Lv(ave.) cd/m2 | Lv max/ Lv age | CCT (Kevin) | Comments |
|---|---|---|---|---|---|
| 0.5 | 6337 | 3080 | 2.0575 | 4360 | Sufficient hot-spot suppression |

TABLE 7-2-continued

Optical luminance, luminance distribution and CCT performance data

| Distance (inch) | Lv(max.) cd/m2 | Lv(ave.) cd/m2 | Lv max/ Lv age | CCT (Kevin) | Comments |
|---|---|---|---|---|---|
| 1 | 3348 | 2389 | 1.4014 | 4358 | Excellent hot-spot suppression |
| 1.5 | 2252 | 1842 | 1.2226 | 4354 | Excellent hot-spot suppression |
| 2 | 1697 | 1469 | 1.1552 | 4349 | Excellent hot-spot suppression |

Example 8 (1.2 wt. % SMX-5R+2.5 wt. % 3 Um BaSO4+0.01 wt. % Nano ZnO NanoTek in V045 PMMA A diffusing product containing 1.2 wt. % of Sum SMX-5R (n=1.555, from Sekisui), 2.5 wt. % of 3 um BaSO4 diffusion particles (n=1.64) and 0.01 wt. % Nano ZnO Nanotek (n=2.0, non-modified ZnO with the elongated particle size of about 10-150 nm from Alfa Aesar) in Plexiglas® V045 was compounded and injection molded into the plaques ranged from 0.030" to 0.125" in thickness, using 90T injection molder with a die temperature of 230° C. The melt flow rate of the pellets was measured at 2.0 g/10 minutes at 230° C./3.8 kg.

The optical haze values from the variable thickness samples were measured at ~100% (saturated). The luminous transmission was measured over 50% at the thickness of less than 0.08". The diffuse light scattering from the sample at a 2-inch distance away from the detector was measured over 94% when the thickness was at 0.060" and higher.

The data is compiled in Table 8-1.

TABLE 8-1

Optical performance data

| Thickness | Haze | L* | a* | b* | YI-E313 | Y | T(0)%: 0 inch | T(2)%: 2 inch | [T(0) − T(2)]/T(0) |
|---|---|---|---|---|---|---|---|---|---|
| 0.030" | 101.0 | 93.03 | 0.30 | 0.74 | 1.69 | 83.044 | 78.226 | 9.5928 | 87.74% |
| 0.040" | 101.0 | 89.73 | 0.39 | 1.42 | 3.17 | 75.729 | 70.552 | 5.722 | 91.89% |

TABLE 8-1-continued

| | | | | | | | T(0)%: | T(2)%: | [T(0) − |
| Thickness | Haze | L* | a* | b* | YI-E313 | Y | 0 inch | 2 inch | T(2)]/T(0) |
|---|---|---|---|---|---|---|---|---|---|
| 0.060" | 102.0 | 84.45 | 0.42 | 1.85 | 4.26 | 64.938 | 60.033 | 3.537 | 94.11% |
| 0.080" | 102.0 | 80.15 | 0.33 | 1.81 | 4.30 | 56.954 | 52.693 | 2.7316 | 94.82% |
| 0.100" | 102.0 | 76.56 | 0.25 | 1.94 | 4.67 | 50.802 | 47.448 | 2.375 | 94.99% |
| 0.125" | 102.0 | 72.70 | 0.18 | 2.24 | 5.51 | 44.714 | 42.371 | 2.1372 | 94.96% |

Figure 8:
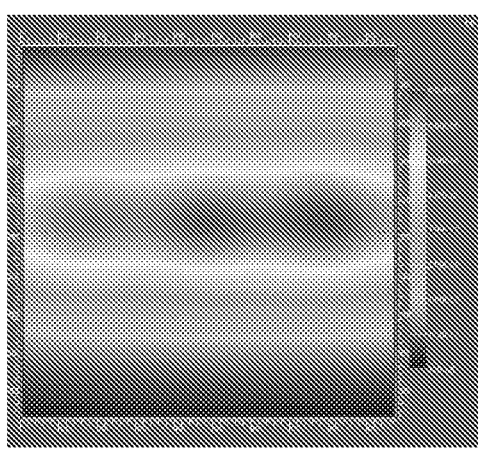
FIG. 8: Shows a 2D optical image of a 0.08" injection-molded diffusion sheet measured in Konica Minolta CA2500, in which the sheet was located at a). 0.5 inches and b). 1 inch away the LED light sources.
Figure 8:
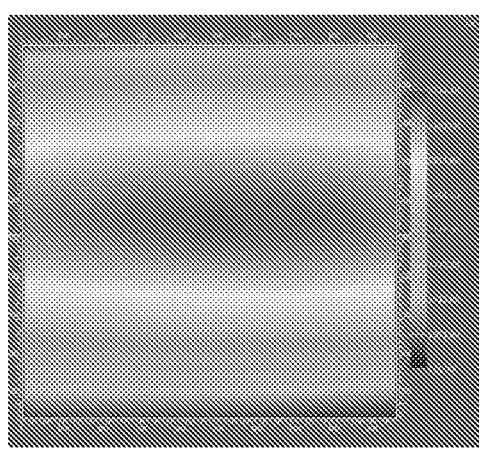

A Konica Minolta CA2500 2D photometer was used to measure the luminance and luminance distribution from the LED illuminated diffusing sheets. The distance from LED light sources to the CA2500 2D detector lens was fixed at 12 inches. As shown in FIG. 8, a 0.08" injection molded plaque containing the mixture of 1.2 wt. % 5 um SMX-5R, 2.5 wt. % 3 um BaSO4 diffusion beads, and 0.01 wt. % nano ZnO NanoTek exhibited sufficiently good optical hiding performance from LED illuminated diffusion sheet, in which the sample was located only at 0.5 inches away from the LED light sources. The maximum luminance (6,814 cd/m$^2$), average luminance (3,265 cd/m$^2$), and CCT (4,345° K) were detected using a Konica Minolta CA2500 2D photometer, along with its luminance distribution from the LED illuminated diffusion sheet. When the sample was moved to 1 inch away from the LED light sources, the maximum luminance (3,511 cd/m$^2$), average luminance (2,482 cd/m$^2$), and CCT (4,315° K) were detected, along with its broad luminance distribution from this 0.08" diffusion sheet under the same condition.

When the testing sample was closer to the LED light sources, the optical luminance and/or brightness [Lv (max.) and Lv. (ave.)] was increased. The optical hiding performance of LED hot spots was directly associated with the ratio of Lv. (max.)/Lv (ave.). When the ratio of Lv. (max.)/Lv (ave.) was near 2.1, as listed in Table 8-2, individual hot spots from the illuminated sheet were suppressed. The optical hiding performance was improved as the sample-to-LED distance was increased. The correlated color temperature (CCT) was distance-dependent in this sample. The CCT temperature changed from 4345° K in 0.5 inches away the LED light sources to 4304° K in 2 inches away the LED light sources, along with 4415~4425° K from original LED light sources without having a diffusion sheet.

TABLE 8-2

Optical luminance, luminance distribution and CCT performance data

| Distance (inch) | Lv(max. cd/m2) | Lv(ave. cd/m2) | Lv max/ Lv age | CCT (Kevin) | Comments |
|---|---|---|---|---|---|
| 0.5 | 6814 | 3265 | 2.0870 | 4345 | Sufficient hot-spot suppression |
| 1 | 3511 | 2482 | 1.4146 | 4315 | Excellent hot-spot suppression |
| 1.5 | 2391 | 1951 | 1.2255 | 4311 | Excellent hot-spot suppression |
| 2 | 1744 | 1525 | 1.1436 | 4304 | Excellent hot-spot suppression |

Example 9 (0.8 wt. % SMX-5R+2.5 wt. % 3 Um BaSO4+0.01 wt. % Nano ZnO C1 in V045 PMMA)

A diffusing product containing 0.8 wt. % of Sum SMX-5R (n=1.555, from Sekisui), 2.5 wt. % of 3 um BaSO4 diffusion particles (n=1.64) and 0.01 wt. % Nano ZnO Nanotek C1 (n=2.0, nonpolar organo-silane modified ZnO with the elongated particle size of about 10-150 nm from Alfa Aesar) in Plexiglas® V045 was compounded and injection molded into the plaques ranged from 0.030" to 0.125" in thickness, using 90T injection molder with a die temperature of 230° C. The melt flow rate of the pellets was measured at 2.0 g/10 minutes at 230° C./3.8 kg.

The optical haze values from the variable thickness samples were measured at ~100% (saturated). The luminous transmission was measured over 50% at the thickness of less than 0.08". The diffuse light scattering from the sample at a 2-inch distance away from the detector was measured over 93% when the thickness was at 0.060" and higher.

The data is compiled in Table 9-1.

TABLE 9-1

| | | | | | | | T(0)%: | T(2)%: | [T(0) − |
| Thickness | Haze | L* | a* | b* | YI-E313 | Y | 0 inch | 2 inch | T(2)]/T(0) |
|---|---|---|---|---|---|---|---|---|---|
| 0.030" | 101.0 | 93.80 | 0.28 | 0.25 | 0.71 | 84.814 | 80.347 | 11.708 | 85.43% |
| 0.040" | 101.0 | 90.52 | 0.37 | 1.00 | 2.31 | 77.434 | 72.305 | 6.598 | 90.87% |
| 0.060" | 101.0 | 85.01 | 0.44 | 1.63 | 3.80 | 66.032 | 61.578 | 3.8902 | 93.68% |
| 0.080" | 102.0 | 80.64 | 0.37 | 1.60 | 3.84 | 57.821 | 53.878 | 2.9072 | 94.60% |
| 0.100" | 102.0 | 77.47 | 0.29 | 1.71 | 4.14 | 52.310 | 48.392 | 2.4747 | 94.89% |
| 0.125" | 102.0 | 73.25 | 0.23 | 1.93 | 4.81 | 45.552 | 43.097 | 2.2116 | 94.87% |

Figure 9:
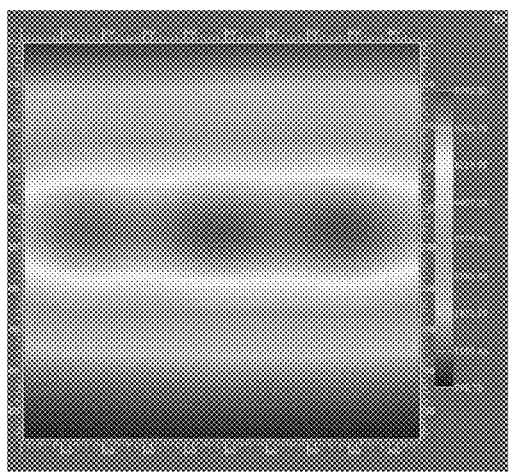
FIG. 9: Shows a 2D optical image of a 0.08" injection-molded diffusion sheet measured in Konica Minolta CA2500, in which the sheet was located at a). 0.5 inches and b). 1 inch away the LED light sources.
Figure 9:
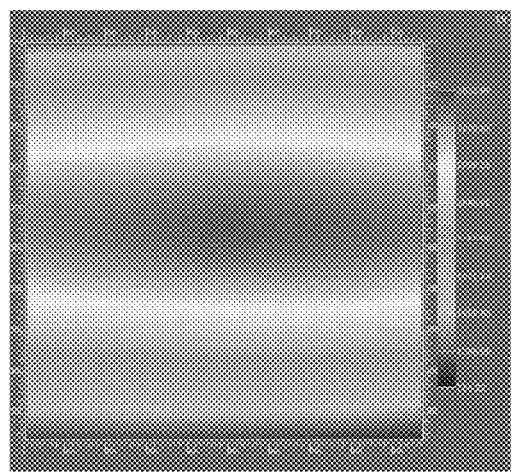

A Konica Minolta CA2500 2D photometer was used to measure the luminance and luminance distribution from the LED illuminated diffusing sheets. The distance from LED light sources to the CA2500 2D detector lens was fixed at 12 inches. As shown in FIG. 9, a 0.08" injection molded plaque containing the mixture of 0.8 wt. % Sum SMX-5R, 2.5 wt. % 3 um BaSO4 diffusion beads, and 0.01 wt. % nano ZnO NanoTek C1 exhibited sufficiently good optical hiding performance from LED illuminated diffusion sheet, in which the sample was located only at 0.5 inches away from the LED light sources. The maximum luminance (6,842 cd/m$^2$), average luminance (3,319 cd/m$^2$), and CCT (4,346° K) were detected using a Konica Minolta CA2500 2D photometer, along with its luminance distribution from the LED illuminated diffusion sheet. When the sample was moved to 1 inch away from the LED light sources, the maximum luminance (3,632 cd/m$^2$), average luminance (2,549 cd/m$^2$), and CCT (4,319° K) were detected, along with its broad luminance distribution from this 0.08" diffusion sheet under the same condition.

When the testing sample was closer to the LED light sources, the optical luminance and/or brightness [Lv (max.) and Lv. (ave.)] was increased. The optical hiding performance of LED hot spots was directly associated with the ratio of Lv. (max.)/Lv (ave.). When the ratio of Lv. (max.)/Lv (ave.) was near 2.1, as listed in Table 9-2, individual hot spots from the illuminated sheet were suppressed. The optical hiding performance was improved as the sample-to-LED distance was increased. The correlated color temperature (CCT) was distance-dependent in this sample. The CCT temperature changed from 4352° K in 0.5 inches away the LED light sources to 4313° K in 2 inches away the LED light sources, along with 4415~4425° K from original LED light sources without having a diffusion sheet.

TABLE 9-2

Optical luminance, luminance distribution and CCT performance data

| Distance (inch) | Lv(max. cd/m2) | Lv(ave. cd/m2) | Lv max/ Lv age | CCT (Kevin) | Comments |
|---|---|---|---|---|---|
| 0.5 | 6842 | 3319 | 2.0615 | 4352 | Sufficient hot-spot suppression |
| 1 | 3632 | 2549 | 1.4249 | 4319 | Excellent hot-spot suppression |
| 1.5 | 2496 | 2028 | 1.2308 | 4316 | Excellent hot-spot suppression |
| 2 | 1813 | 1579 | 1.1482 | 4313 | Excellent hot-spot suppression |

Example 10 (1 wt. % SMX-5R+2.5 wt. % 3 Um BaSO4+0.01 wt. % Nano ZnO C2 in V045 PMMA A diffusing product containing 1 wt. % of Sum SMX-5R (n=1.555, from Sekisui), 2.5 wt. % of 3 um BaSO4 diffusion particles (n=1.64) and 0.01 wt. % Nano ZnO Nanotek C2 (n=2.0, polar organo-silane modified ZnO) with the elongated particle size of about 10-150 nm from Alfa Aesar) in Plexiglas® V045 was compounded and injection molded into the plaques ranged from 0.030" to 0.125" in thickness, using 90T injection molder with a die temperature of 230° C. The melt flow rate of the pellets was measured at 2.0 g/10 minutes at 230° C./3.8 kg.

The optical haze values from the variable thickness samples were measured at ~100% (saturated). The luminous transmission was measured over 50% at the thickness of 0.08" and less. The diffuse light scattering from the sample at a 2-inch distance away from the detector Using Lambda 950 was measured over 93.8% when the thickness was at 0.060" and higher.

The data is compiled in Table 10-1.

TABLE 10-1

| | Optical performance data | | | | | | | | |
|---|---|---|---|---|---|---|---|---|---|
| Thickness | Haze | L* | a* | b* | YI-E313 | Y | T(0)%: 0 inch | T(2)%: 2 inch | [T(0) − T(2)]/T(0) |
| 0.030" | 101.0 | 93.65 | 0.26 | 0.55 | 1.27 | 84.465 | 79.573 | 11.125 | 86.02% |
| 0.040" | 101.0 | 90.21 | 0.37 | 1.37 | 3.05 | 76.752 | 71.425 | 6.2866 | 91.20% |
| 0.060" | 101.0 | 85.00 | 0.42 | 1.86 | 4.26 | 66.012 | 61.069 | 3.7443 | 93.87% |
| 0.080" | 102.0 | 80.42 | 0.34 | 2.05 | 4.82 | 57.431 | 53.268 | 2.8222 | 94.70% |
| 0.100" | 102.0 | 76.75 | 0.27 | 1.95 | 4.71 | 51.110 | 47.947 | 2.432 | 94.93% |
| 0.125" | 102.0 | 72.85 | 0.18 | 2.25 | 5.52 | 44.940 | 42.693 | 2.1755 | 94.90% |

Figure 10:
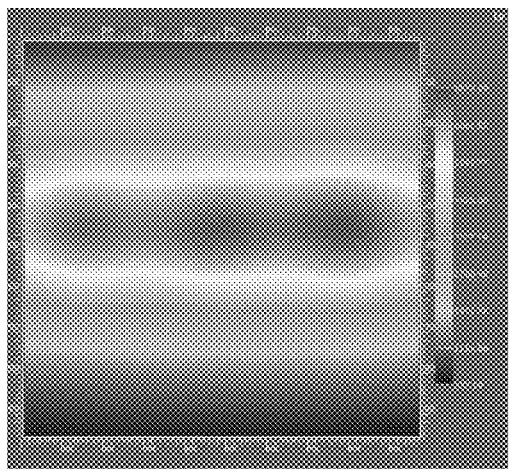
FIG. 10: Shows a 2D optical image of a 0.08" injection-molded diffusion sheet measured in Konica Minolta CA2500, in which the sheet was located at a). 0.5 inches and b). 1 inch away the LED light sources.
Figure 10:
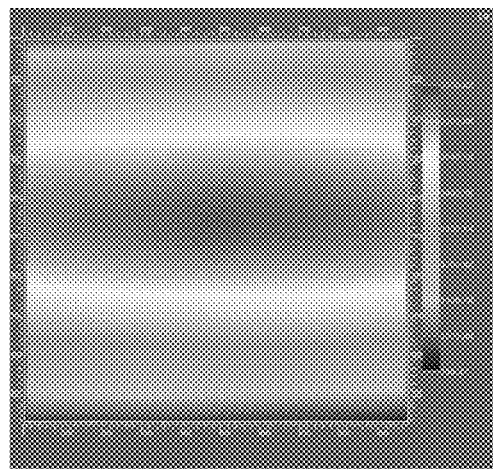

A Konica Minolta CA2500 2D photometer was used to measure the luminance and its luminance distribution from the LED illuminated diffusing sheets. The distance from LED light sources to the CA2500 2D detector lens was fixed at 12 inches. As shown in FIG. 10, a 0.08" injection molded plaque containing the mixture of 1 wt. % 5 um SMX-5R, 2.5 wt. % 3 um BaSO4 diffusion beads, and 0.01 wt. % nano ZnO NanoTek C2 exhibited sufficient good optical hiding performance from LED illuminated diffusion sheet, in which the sample was located only at 0.5 inches away from the LED light sources. The maximum luminance (6,879 cd/m$^2$), average luminance (3,287 cd/m$^2$), and CCT (4,346° K) were detected using a Konica Minolta CA2500 2D photometer, along with its luminance distribution from the LED illuminated diffusion sheet. When the sample was moved to 1 inch away from the LED light sources, the maximum luminance (3,558 cd/m$^2$), average luminance (2,494 cd/m$^2$), and CCT (4,302° K) were detected, along with its broad luminance distribution from this 0.08" diffusion sheet under the same condition.

When the testing sample was closer to the LED light sources, the optical luminance and/or brightness [Lv (max.) and Lv. (ave.)] was increased. The optical hiding performance of LED hot spots was directly associated with the ratio of Lv. (max.)/Lv (ave.). When the ratio of Lv. (max.)/

Lv (ave.) was near 2.1, as listed in Table 10-2, individual hot spots from the illuminated sheet were suppressed. The optical hiding performance was improved as the sample-to-LED distance was increased. The correlated color temperature (CCT) was distance-dependent in this sample. The CCT temperature changed from 4346° K in 0.5 inches away the LED light sources to 4293° K in 2 inches away the LED light sources, along with 4415~4425° K from original LED light sources without having a diffusion sheet.

TABLE 10-2

Optical luminance, luminance distribution and CCT performance data

| Distance (inch) | Lv(max. cd/m2) | Lv(ave. cd/m2) | Lv max/ Lv age | CCT (Kevin) | Comments |
|---|---|---|---|---|---|
| 0.5 | 6879 | 3287 | 2.0928 | 4346 | Sufficient hot-spot suppression |
| 1 | 3558 | 2494 | 1.4266 | 4302 | Excellent hot-spot suppression |
| 1.5 | 2457 | 1995 | 1.2316 | 4294 | Excellent hot-spot suppression |
| 2 | 1802 | 1564 | 1.1522 | 4293 | Excellent hot-spot suppression |

Example 11 (1 wt. % SMX-5R+2.7 wt. % 3 um BaSO4+0.01 wt. % ZB in V045 PMMA

A diffusing product containing 1 wt. % of Sum SMX-5R (n=1.555, from Sekisui), 2.7 wt. % of 3 um BaSO4 diffusion particles (n=1.64) and 0.01 wt. % zinc borate (n=1.58, with the particle size of 1-4 um from Lord's Additives) in Plexiglas® V045 was compounded and injection molded into the plaques ranged from 0.030" to 0.125" in thickness, using 90T injection molder with a die temperature of 230° C. The melt flow rate of the pellets was measured at 2.0 g/10 minutes at 230° C./3.8 kg.

The optical haze values from the variable thickness samples were measured at ~100% (saturated). The luminous transmission was measured over 50% at the thickness of 0.08" and less. The diffuse light scattering from the sample at a 2-inch distance away from the detector Using Lambda 950 was measured over 94% when the thickness was at 0.060" and higher.

The data is compiled in Table 11-1

TABLE 11-1

Optical performance data

| Thickness | Haze | L* | a* | b* | YI-E313 | Y | T(0)%: 0 inch | T(2)%: 2 inch | [T(0) − T(2)]/T(0) |
|---|---|---|---|---|---|---|---|---|---|
| 0.030" | 101.0 | 93.61 | 0.30 | 0.13 | 0.50 | 84.360 | 79.47 | 10.3 | 87.04% |
| 0.040" | 101.0 | 90.15 | 0.40 | 0.81 | 1.96 | 76.635 | 71.259 | 5.9093 | 91.71% |
| 0.060" | 102.0 | 84.81 | 0.42 | 1.28 | 3.07 | 65.637 | 60.473 | 3.5954 | 94.05% |
| 0.080" | 102.0 | 80.14 | 0.35 | 1.30 | 3.20 | 56.936 | 52.735 | 2.7544 | 94.78% |
| 0.100" | 102.0 | 76.50 | 0.27 | 1.37 | 3.40 | 50.702 | 47.735 | 2.4011 | 94.97% |
| 0.125" | 102.0 | 73.31 | 0.21 | 1.72 | 4.30 | 45.641 | 42.545 | 2.1577 | 94.93% |

Figure 11:
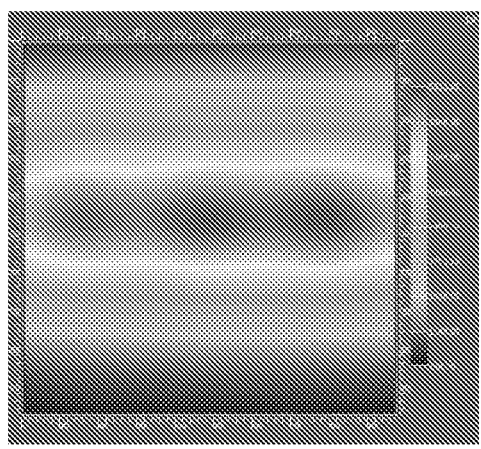
FIG. 11: Shows a 2D optical image of a 0.08" injection-molded diffusion sheet measured in Konica Minolta CA2500, in which the sheet was located at a). 0.5 inches and b). 1 inch away the LED light sources.
Figure 11:
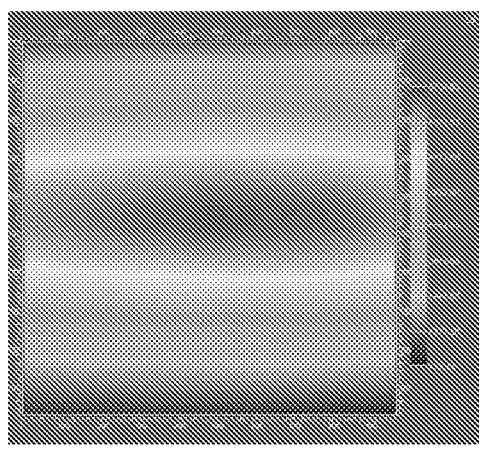

A Konica Minolta CA2500 2D photometer was used to measure the luminance and its luminance distribution from the LED illuminated diffusing sheets. The distance from LED light sources to the CA2500 2D detector lens was fixed at 12 inches. As shown in FIG. 11, a 0.08" injection molded plaque containing the mixture of 1 wt. % Sum SMX-5R, 2.7 wt. % 3 um BaSO4 diffusion beads, and 0.01 wt. % Zinc Borate particles exhibited quite good optical hiding performance from LED illuminated diffusion sheet, in which the sample was located only at 0.5 inches away from the LED light sources. The maximum luminance (6,632 cd/m$^2$), average luminance (3,262 cd/m$^2$), and CCT (4,363° K) were detected, along with its luminance distribution from the LED illuminated diffusion sheet. When the sample was moved to 1 inch away from the LED light sources, the maximum luminance (3,540 cd/m$^2$), average luminance (2,518 cd/m$^2$), and CCT (4,337° K) were detected, along with its broad luminance distribution from this 0.08" diffusion sheet.

When the testing sample was closer to the LED light sources, the optical luminance and/or brightness [Lv (max.) and Lv. (ave.)] was increased. The optical hiding performance of LED hot spots was directly associated with the ratio of Lv. (max.)/Lv (ave.). When the ratio of Lv. (max.)/Lv (ave.) was near 2, as listed in Table 11-2, individual hot spots from the illuminated sheet were suppressed. The optical hiding performance was improved as the sample-to-LED distance was increased. The correlated color temperature (CCT) was distance-dependent in this sample. The CCT temperature changed from 4363° K in 0.5 inches away the LED light sources to 4329° K in 2 inches away the LED light sources, along with 4415~4425° K from original LED light sources without having a diffusion sheet.

TABLE 11-2

Optical luminance, luminance distribution and CCT performance data

| Distance (inch) | Lv(max. cd/m2) | Lv(ave. cd/m2) | Lv max/ Lv age | CCT (Kevin) | Comments |
|---|---|---|---|---|---|
| 0.5 | 6632 | 3262 | 2.0331 | 4363 | Sufficient hot-spot suppression |
| 1 | 3540 | 2518 | 1.4059 | 4337 | Excellent hot-spot suppression |
| 1.5 | 2433 | 1991 | 1.2220 | 4335 | Excellent hot-spot suppression |
| 2 | 1783 | 1558 | 1.1444 | 4329 | Excellent hot-spot suppression |

Within this specification embodiments have been described in a way which enables a clear and concise specification to be written, but it is intended and will be appreciated that embodiments may be variously combined or separated without parting from the invention. For example, it will be appreciated that all preferred features described herein are applicable to all aspects of the invention described herein.

Aspects of the invention include:

1. A translucent, light-diffusing thermoplastic article comprising a blend composition of
   a) a thermoplastic polymer matrix material,
   b) from 0.01 to 10 weight percent of organic polymer diffusing particles that are refractive index (R.I.) mismatched to the matrix polymer, wherein the absolute difference between the matrix polymer and diffusing organic polymer particles is from greater than 0.02 to 0.15,
   c) optionally from 0 to 15 weight percent of inorganic diffusing particles,
   wherein said weight percentage is based on the weight of the total light-diffusing composition,
   wherein a sheet or film has a luminous transmission of greater than 40%, an optical haze of greater than 95% and a diffuse light scattering of greater than 85%,
   and wherein the organic particles are selected to provide a simulated transmittance ($I/I_0$) of less than 0.5.

2. The translucent, light diffusing covering of aspect 1, wherein the simulated transmission at $\lambda=550$ nm, for a sample thickness of 3 mm is less than 0.5.

3. The translucent, light diffusing covering of aspects 1 or 2, wherein the simulated transmittance ($I/I_0$) is less than 0.4, and/or the simulated transmission at $\lambda=550$ nm, for a sample thickness of 3 mm is less than 0.4.

4. The translucent, light-diffusing covering of any of aspects 1 to 3, wherein the absolute difference between the refractive index of said matrix polymer and said organic diffusing particles is from 0.03 to 0.12.

5. The translucent, light-diffusing covering of any of aspects 1 to 4, wherein said polymer matrix is selected from the group consisting of crystal polystyrene, polyethylene terephthalate (PET), a transparent polyolefin, transparent polypropylene, acrylics, a transparent polyamide, styrene acrylonitrile (SAN), and polycarbonate.

6. The translucent, light-diffusing covering of any of aspects 1 to 5, wherein said polymer matrix further comprises from 5 to 45 weight percent of one or more impact modifiers.

7. The translucent, light-diffusing covering of any of aspects 1 to 6, wherein said organic diffusing particles have an average particle size of from 0.6 to 40 microns, preferably from 1 to 25 microms.

8. The translucent, light-diffusing covering of any of aspects 1 to 7, wherein the correlated color temperature of the light transmitted from said translucent, light-diffusing thermoplastic article is in the range of 3500-5200° Kelvin, preferably in the range of 3900-4800° Kelvin.

9. The translucent, light-diffusing covering of any of aspects 1 to 8, wherein said composition comprises from 0.001 to 15 weight percent of inorganic diffusing particles, based on the weight of the total light-diffusing covering.

10. The translucent, light-diffusing covering of any of aspects 1 to 9, wherein said composition comprises from 0.1 to 5 weight percent of organic polymer diffusing particles, and from 0.001 to 15 weight percent of inorganic diffusing particles, 11. The translucent, light-diffusing covering of any of aspects 1 to 10, wherein said average particle size of said inorganic diffusing particles is from 10 nm to 25 microns.

12. The translucent, light-diffusing covering of any of aspects 1 to 11, wherein said inorganic diffusing particles are selected from the group consisting of barium sulfate, silicon dioxide, calcium carbonate, aluminum oxide, titanium dioxide, zinc oxide, silicates, natural and synthetic clays and mixtures thereof.

13. The translucent, light-diffusing covering of any of aspects 1 to 12, wherein said composition further comprises from 0.00001 to 1 weight percent, and preferably from 0.001 to 0.1 weight percent, of one or more optical brighteners.

14. The translucent, light-diffusing covering of aspect 13, wherein said optical brighteners are selected from nano-sized zinc oxide compounds and zinc borate.

15. The translucent, light-diffusing covering of any of aspects 1-14, wherein said composition further comprises from 0.0001 to 1 weight percent of one or more optical brighteners and 0.01 to 15 weight percent of inorganic diffusing particles.

16. The transparent, light diffusing covering of any of aspects 1-15, wherein said article is used in forming an interior lighting fixture, an advertising display, a sign, automotive lighting, desktop monitors, and LCD TVs.

What is claimed is:

1. A translucent, light-diffusing thermoplastic article comprising a blend composition of
   a) a thermoplastic acrylic polymer matrix material, wherein said acrylic polymer comprises from 80 to 99.5 weight percent of methyl methacrylate monomer units,
   b) from 0.01 to 5.8 weight percent of organic polymer diffusing particles that are refractive index (R.I.) mismatched to the matrix polymer, wherein the absolute difference between the matrix polymer R.I. and the diffusing organic polymer particles R.I. is from greater than 0.02 to 0.15,
   c) optionally from 0 to 8 weight percent of inorganic diffusing particles,
   wherein said weight percentage is based on the weight of the total light-diffusing composition,
   wherein, when said article comprising said blend composition is a sheet or film, said sheet of film has a luminous transmission of greater than 40%, an optical haze of greater than 95% and a diffuse light scattering of greater than 85%,
   and wherein the organic particles are selected to provide a calculated transmittance ($I/I_0$) of less than 0.5 calculated for a sample of 3 mm thickness and a $\lambda=550$ nm.

2. The translucent, light diffusing article of claim 1, wherein the calculated transmittance ($I/I_0$) is less than 0.4.

3. The translucent, light diffusing article of claim 1, wherein the absolute difference between the refractive index of said matrix polymer and refractive index of said organic diffusing particles is from 0.03 to 0.12.

4. The translucent, light diffusing article of claim 1, wherein said polymer matrix further comprises from 5 to 45 weight percent of one or more impact modifiers.

5. The translucent, light diffusing article of claim 1, wherein said organic diffusing particles have an average particle size of from 0.6 to 40 microns.

6. The translucent, light diffusing article of claim 4, wherein said organic diffusing particles have an average particle size of from 1 to 25 microns.

7. The translucent, light diffusing article of claim 1, wherein the correlated color temperature of the light transmitted from said translucent, light-diffusing thermoplastic article is in the range of 3500-5200 Kelvin when the LED light source possess the CCT of 4420 Kelvin.

8. The translucent, light diffusing article of claim 1, wherein the correlated color temperature of the light transmitted from said translucent, light-diffusing thermoplastic article is in the range of 3900-4800 Kelvin when the LED light source possess the CCT of 4420 Kelvin.

9. The translucent, light diffusing article of claim 1, wherein said composition comprises from 0.001 to 15 weight percent of inorganic diffusing particles, based on the weight of the blend composition.

10. The translucent, light diffusing article of claim 9, wherein said composition comprises from 0.1 to 5 weight percent of organic polymer diffusing particles, and from 0.001 to 15 weight percent of inorganic diffusing particles.

11. The translucent, light diffusing article of claim 1, wherein said inorganic diffusing particles have an average particle size from 10 nm to 25 microns.

12. The translucent, light diffusing article of claim 1, wherein said inorganic diffusing particles are selected from the group consisting of barium sulfate, silicon dioxide, calcium carbonate, aluminum oxide, titanium dioxide, zinc oxide, silicates, natural and synthetic clays and mixtures thereof.

13. The translucent, light diffusing article of claim 1, wherein said composition further comprises from 0.00001 to 1 weight percent of one or more optical brighteners.

14. The translucent, light diffusing article of claim 1, wherein said composition further comprises from 0.001 to 0.1 weight percent of one or more optical brighteners.

15. The translucent, light diffusing article of claim 13, wherein said optical brighteners are selected from nano-sized zinc oxide compounds and zinc borate.

16. The translucent, light diffusing article of claim 1, wherein said composition further comprises from 0.0001 to 1 weight percent of one or more optical brighteners and 0.01 to 15 weight percent of inorganic diffusing particles.

17. The translucent, light diffusing article of claim 1, wherein said article is a light-diffusing covering as part of an interior lighting fixture, an advertising display, a sign, automotive lighting, desktop monitors, and LCD TVs.

18. The translucent, light diffusing article of claim 1, wherein said article has a thickness of 0.075 to 15 mm.

19. The translucent, light diffusing article of claim 1, wherein the particle size distribution is narrow, with 90 percent of the particles being within +/−50% of the mean particle size.

* * * * *